(12) United States Patent
Arai et al.

(10) Patent No.: US 6,201,542 B1
(45) Date of Patent: Mar. 13, 2001

(54) THREE-DIMENSIONAL POLYGON DISPLAY APPARATUS USING PROGRESSIVE POLYGON DATA

(75) Inventors: Masatoshi Arai; Ryosuke Miyata; Koichi Murakami, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/213,258

(22) Filed: Dec. 17, 1998

(30) Foreign Application Priority Data

May 22, 1998 (JP) .................................................. 10-141289

(51) Int. Cl.[7] .................................................. G06F 15/00
(52) U.S. Cl. .................................................. 345/419
(58) Field of Search .................................. 345/419, 420, 345/426, 427, 428, 429, 430, 433, 117, 121

(56) References Cited

U.S. PATENT DOCUMENTS 5,598,516 * 1/2000 Mori ...................................... 345/426

6,014,472 * 1/2000 Minami et al. ...................... 382/285

FOREIGN PATENT DOCUMENTS 7-160898    6/1995   (JP) .

* cited by examiner

*Primary Examiner*—Phu K. Nguyen
(74) *Attorney, Agent, or Firm*—Staas & Halsey LLP

(57) ABSTRACT

Based on the importance of object portions, a three-dimensional polygon display apparatus adjusts the extent to which the amount of polygon data is reduced by progressive polygon data reduction. An object is divided into object portions, which are magnified and adjusted depending on their importance or conspicuity, or the extent to which polygon reduction processing is performed is set individually. Object portions hidden inside the object are rearranged on the outside, or the enclosing object portions are deformed to expose the internal object portions on the outside. After this adjustment, polygon reduction processing is performed. One set of texture information is assigned to each vertex in the case of a development into two dimensions. If polygon vertices have been moved, the used texture information is that of the closest vertex, or an intrapolation of the texture information of surrounding vertices.

13 Claims, 20 Drawing Sheets

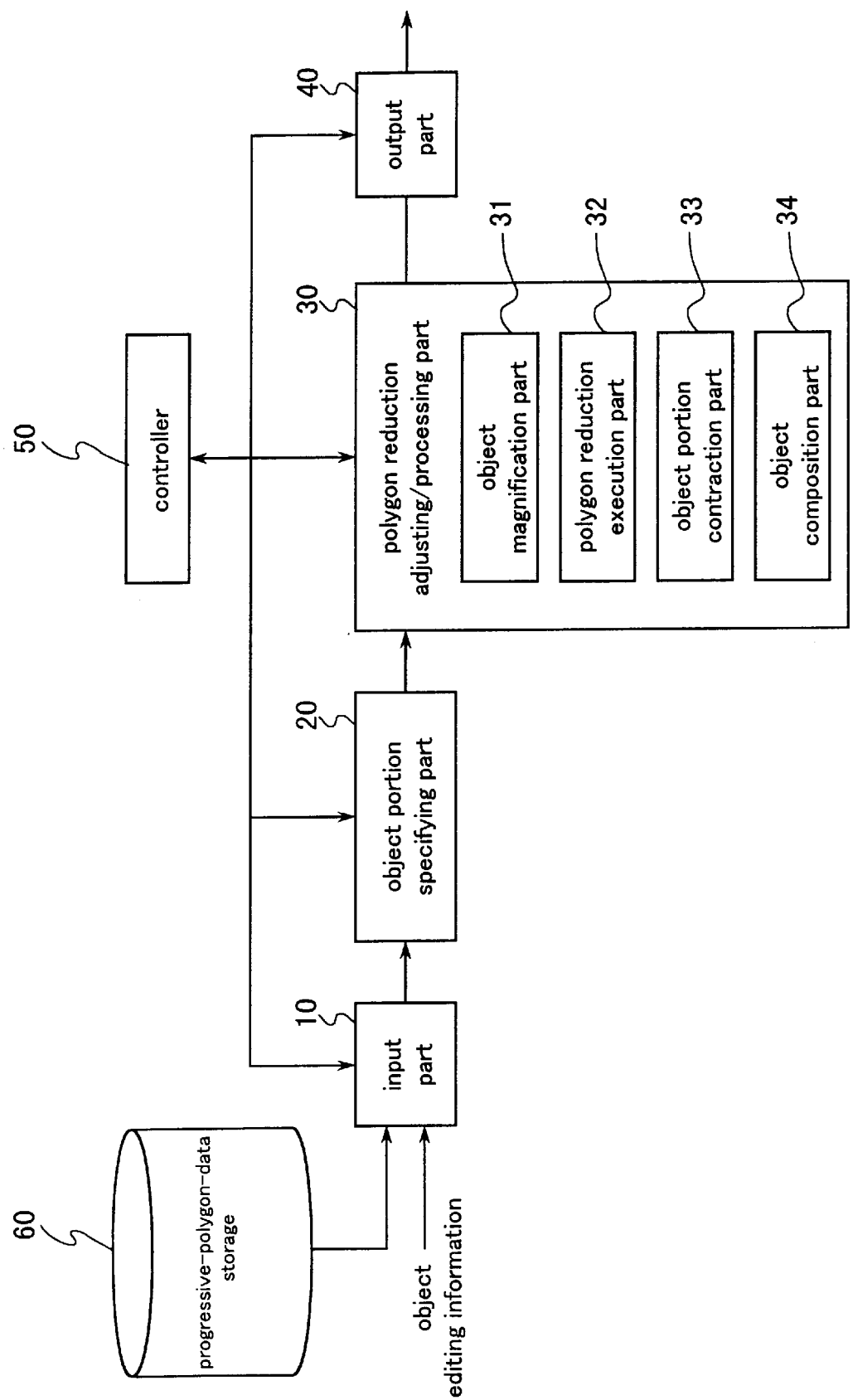
F I G . 1

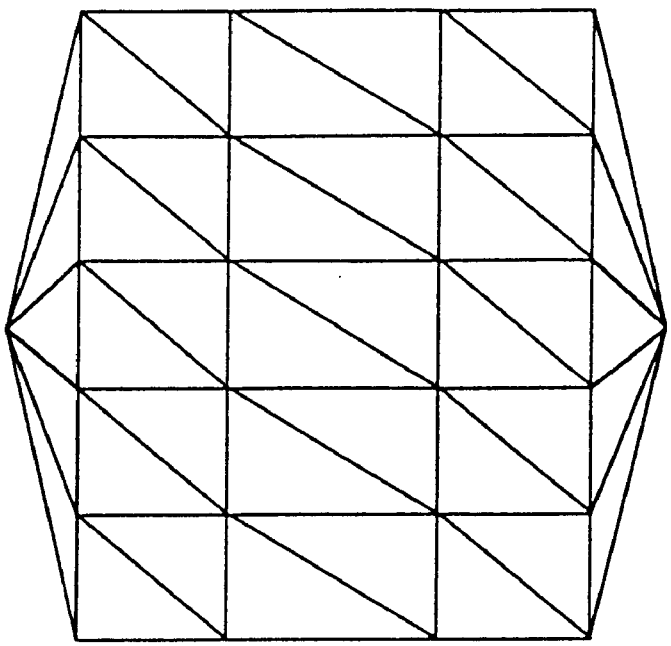
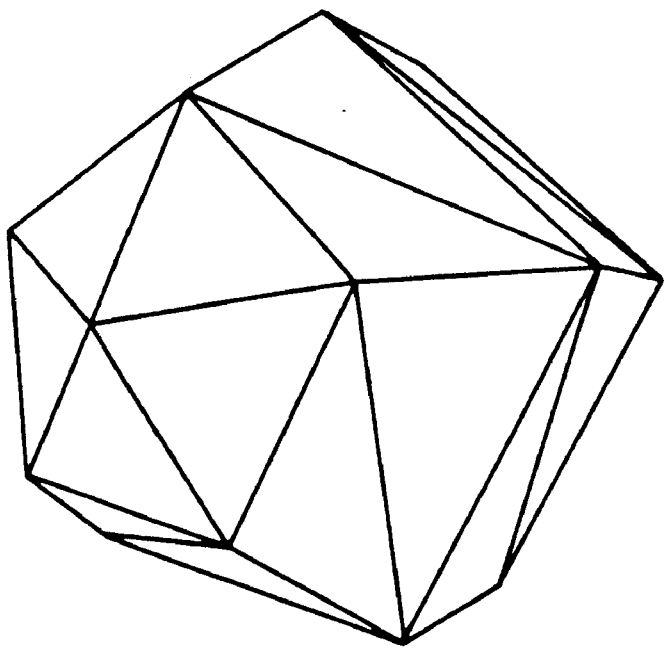

THREE-DIMENSIONAL POLYGON DISPLAY APPARATUS USING PROGRESSIVE POLYGON DATA

FIELD OF THE INVENTION

This invention relates to a three-dimensional polygon display apparatus using progressive polygon data for rendering an object with a number of polygons that depends on certain display conditions. In particular, the present invention relates to a three-dimensional polygon display apparatus using progressive polygon data and diminishing the number of polygons assigned to an object (polygon reduction), which can adjust the extent to which polygon reduction is performed for each portion of the object, and reduce the amount of data for texture mapping.

BACKGROUND OF THE INVENTION

In recent years, the ever higher performance of computer systems and the constant development of multimedia processing techniques have led to environments that can process high-level three-dimensional (abbreviated "3D" in the following) computer graphics (abbreviated "CG" in the following) even on personal computers. Dedicated accelerator boards for processing of three-dimensional CG are under constant development.

There are several types of CG data formats. For example, games, that animate characters or objects such as artificial creatures, usually store the object data mainly in form of polygons. To render the object in a fast drawing procedure, a texture covers the created progressive polygon mesh.

When the data is stored in polygon format, a larger number of polygons should be assigned to the object for high-quality CG processing. However, when the polygons are displayed in real-time, there is a limit to the number of polygons that can be displayed. For example, taking a current personal computer for the platform to perform real-time processing, the number of polygons has to be limited to about 2000 polygons per frame. On the other hand, however, the user's expectancy towards a game is high, and there is a need for high-quality rendering of natural appearing of characters and objects such as artificial creatures. To respond to the user's expectancy, at least 1000–1500 polygons are necessary for each model. Therefore, it is difficult to render a plurality of objects simultaneously. Moreover, when the contents of the game expands and many objects appear on the screen, or when it comes to complex scenes approaching virtual reality, it becomes essential to render a plurality of objects per frame.

As an approach to solve this problem, a three-dimensional real-time image creation apparatus using progressive polygon data is known. The progressive polygon data that this apparatus uses is progressive in accordance with the level of the object display resolution and level of detail. In accordance with the display conditions, the progression level shifts dynamically, so that the polygon number increases or decreases, and the vertices of the progressive polygon mesh can be established. The progressive polygon data comprises basic polygon data of the coarsest level serving as a basis, and detailed polygon data expressed relatively to the basic polygon data.

This basic polygon data is the polygon data of the coarsest level (for example, 200 polygons) created from the original polygon data of the object model (for example, 10000 polygons) that the animator has designed, and corresponds to information in absolute coordinates. The detailed polygon data, on the other hand, is the polygon data on each progression level, which is created by interpolating the basic polygon vertices and corresponds to information in coordinates that are relative to the basic polygon data and the progression level.

The characteristics of the progressive polygons are explained in simple terms with reference to FIG. 20. A progressive polygon mesh 201 consists of progressive polygons of a certain progression levels. A progressive polygon mesh 202 consists of progressive polygons shifted to a coarser level. A progressive polygon mesh 203 consists of progressive polygons shifted to an even coarser level.

The progressive polygon mesh 201 has eight polygon vertices $V_0$–$V_7$. A portion of the polygon vertices is eliminated to reduce the data amount (referred to as "reduction" in the following). For example, a possible rule for the reduction is to reduce one of two adjacent polygon vertices when the distance between the two points is within a certain reference distance L. Then, the reference distance of a certain level is $L_1$ and the reference distance of the next, more detailed level is $L_2$. As is shown in FIG. 20, the distance $L_{V_0V_1}$ between the vertices $V_0$ and $V_1$ in the progressive polygon mesh 201 is $L_{V_0V_1} < L_1 < L_2$, and the distance $L_{V_2V_5}$ between the vertices $V_2$ and $V_5$ is $L_1 < L_{V_2V_5} < L_2$.

The following is an explanation of the shift from the progressive polygon data of the progressive polygon mesh 201 to the next coarser progression level. The reference distance L of the current progression level is $L_1$, so that the polygon vertices $V_0$ and $V_1$, whose distance is less than $L_1$, become candidates for reduction. A new polygon vertex $V_0$ is created by combining the vertices $V_0$ and $V_1$ of the progressive polygon mesh 202 to one vertex, and $V_1$ is reduced, so that the number of polygon vertices is now seven. Similarly, to create the next level, $V_2$ and $V_5$ are chosen as candidates for reduction, because the reference distance L for this level is $L_2$. As a result, $V_5$ is reduced, and the number of polygon vertices becomes six. If this progression is applied to the entire object, and the polygon data is obtained for each progression level and stored as relative data for each level, then the polygon data of each progression level can be dynamically interpolated and reduced even when the progression level for the progressive polygon data is shifted.

For motion design in the course of a game etc., a three-dimensional real-time image creation apparatus using the above-described progressive polygon data can move and transform objects by renewing the basic polygon data. The apparatus decides the progression level according to the number of polygons assigned to the object based on the display conditions for each scene, and interpolates the basic polygon data from the detailed polygon data for this progression level to create the progressive polygon data.

For this conventional technique, polygon reduction processing for real-time processing of three-dimensional CG is an indispensable technique, but it is important, not to convey a sense of incongruity of the drawn objects arising from the user's polygon reduction. This means, deterioration of the appearance has to be avoided while paying special attention to the portions of the object shape that are highly conspicuous to the user. However, conventional three-dimensional real-time imaging apparatuses as introduced above are subject to the following problems.

A first problem is that the distances between the polygon vertices of detailed, protruding features of an object are small, so that they are strongly influenced and even destroyed by a polygon reduction, because they are in a high progression level (detailed level). For example, when the detailed, protruding features are the teeth or the fingers of the object, then this detailed portion has high user conspicuity, and the appearance of the object deteriorates seriously if this portion is destroyed. In order not to destroy the detailed portion, the progression level of the detailed polygon data has to be kept high, so that a reduction of the amount of data for the entire object cannot be achieved.

A second problem is that the conventional polygon reduction processing is performed with respect to the polygons of the object surface, so that the data of the portions hidden inside the object are not reduced. This means that when polygon reduction processing is performed dynamically for an object that is displayed with a certain number of polygons, the polygon reduction processing is performed only for the polygon data forming the outer surface, and not for inner portions, such as tongue or teeth, so that only the portions of the outer surface visible to the user deteriorate.

A third problem is that conventional polygon reduction processing is performed uniformly with respect to all polygon data about the outer surface of the object. This means that the polygon reduction processing cannot be performed with an order of preference for the portions of the object. For example, when the object is an artificial creature, the eyes are the portions with the highest conspicuity for the user, and even when the creature is at a distant location on the screen, its eye-contact is perceived as important, so that it is preferable not to perform a polygon reduction on the portions including the eyes.

A fourth problem is that conventional polygon reduction processing cannot effectively reduce the amount of data for texture mapping. That is to say, the texture data includes two-dimensional texture coordinates (u, v) for the vertices of the polygon, but the three-dimensional coordinates of the vertices are moved because of the polygon reduction processing, and new polygon surfaces are formed, so that processing the texture coordinates of all vertices for all levels of polygon reduction becomes necessary, and the amount of data processing increases.

A fifth problem is that in conventional texture mapping, texture information for all polygon vertices has to be kept for all polygon surfaces. Conventionally, texture information consisted of two-dimensional texture information with respect to all vertices of each polygon surface. If the number of polygon vertices is n, 2n polygon surfaces are formed per average. If the polygon surfaces are triangles, there are three vertices per polygon surface, so that 3×2n sets of texture information, that is 6n sets of texture information are necessary. To reduce this amount of texture information is also an important improvement.

It is an object of the present invention to solve these problems in the polygon reduction processing of the above-described conventional three-dimensional polygon display apparatus, and provide a three-dimensional polygon display apparatus that can adjust the extent to which polygon reduction processing is performed for each portion of the object, perform suitable polygon reduction processing also for the portions hidden inside the object, and effectively reduce the amount of data for texture mapping.

SUMMARY OF THE INVENTION

To achieve the above purposes, a three-dimensional polygon display apparatus using progressive polygon data for forming a progressive polygon mesh of an object in accordance with a display resolution, comprises an object portion specifying part for specifying portions of the object to divide the object into object portions; and a polygon reduction adjusting/processing part for adjusting the extent to which the specified object portions are subjected to polygon reduction processing and for performing polygon reduction processing. The extent to which the amount of polygon data is reduced can be set for each object portion if polygon reduction processing is performed to reduce the amount of polygon data of the object.

With this configuration, the influence of polygon reduction processing on object portions with detailed shape and high conspicuity can be reduced, and a three-dimensional polygon display apparatus with little deterioration of the object appearance when the number of polygons is reduced can be provided.

It is preferable that the polygon reduction adjusting/processing part comprises an object portion magnification part for magnifying a specified object portion; a polygon reduction execution part for performing polygon reduction processing on the magnified object portion; an object portion contraction part for contracting the object portion, which has been subjected to polygon reduction processing, to an original size that it had before the magnification; and an object composition part for storing the object portion, which has been contracted to its original size, in its original position of the object to compose the object; and that the extent to which polygon reduction processing is performed can be adjusted by magnifying the size of the object portion before polygon reduction processing.

With this configuration, object portions with detailed shape and high conspicuity are magnified, and the extent to which polygon reduction processing is performed can be adjusted, so that a three-dimensional polygon display apparatus with little deterioration of the object appearance when the number of polygons is reduced can be provided.

It is preferable that the polygon reduction adjusting/processing part comprises a polygon reduction execution part for performing polygon reduction processing; a polygon reduction ratio specifying part for specifying a thinning-out ratio with which the amount of polygon data is reduced by said polygon reduction execution part; and that the extent to which polygon reduction processing is performed can be adjusted by individually setting with the polygon reduction ratio specifying part the thinning-out ratio for the object portions specified by the object portion specifying part.

With this configuration, the thinning-out ratio for object portions with detailed shape and high conspicuity can be controlled to adjust extent to which polygon reduction processing is performed can be adjusted, so that a three-dimensional polygon display apparatus with little deterioration of the object appearance when the number of polygons is reduced can be provided.

Polygon reduction processing is performed also on the object portion hidden inside the object, if said polygon reduction adjusting/processing part comprises an object portion shifting/adjusting part for shifting and rearranging the specified object portions; a polygon reduction execution part for performing polygon reduction processing; and an object composition part for storing the object portion in its original position of the object to compose the object; and said object portion specifying part specifies an internal object portion that is enclosed by other object portions inside the object; said object portion shifting/adjusting part shifts and rearranges the specified internal object portion outside the object; and said polygon reduction execution part performs polygon reduction processing on the rearranged object.

Polygon reduction processing is performed also on the object portion hidden inside the object if said polygon reduction adjusting/processing part comprises: an object portion deforming/adjusting part for deforming the object; a polygon reduction execution part for performing polygon reduction processing; and an object composition part for storing the object portion in its original position of the object to compose the object; and said object portion specifying part specifies an enclosing object portion enclosing another object portion inside; said object portion deforming/adjusting part deforms the enclosing object portion so as to expose the internal object portion that is enclosed inside; and said polygon reduction execution part performs polygon reduction processing on the deformed object.

It is preferable that the three-dimensional polygon display apparatus further comprises a texture information adjusting part for storing coordinates and texture information relating to polygon vertices before polygon reduction processing, and for creating texture information relating to polygon vertices after polygon reduction processing; and that said texture information adjusting part comprises a polygon vertex comparing part for acquiring coordinates of polygon vertices after polygon reduction processing with said polygon reduction adjusting/processing part, and for comparing polygon vertex coordinates before and after polygon reduction processing and a texture information allocating part for allocating stored texture information unchanged to matching polygon vertices as a result of a comparison of coordinates, and for appropriating and allocating texture information that corresponds to the polygon vertex with the coordinates that are the closest before reduction or shift, to a polygon vertex that does not match and has been subjected to reduction or shift.

With this configuration, the data amount of the texture information can be reduced, and approximate texture information can be generated even when polygon vertices have been reduced or shifted by polygon reduction processing, so that a three-dimensional polygon display apparatus with little deterioration of the object appearance can be provided.

It is preferable that the three-dimensional polygon display apparatus according to claim 1 further comprises a texture information adjusting part for storing coordinates and texture information relating to polygon vertices before polygon reduction processing, and for creating texture information relating to polygon vertices after polygon reduction processing; and said texture information adjusting part comprises a polygon vertex comparing part for acquiring coordinates of polygon vertices after polygon reduction processing with said polygon reduction adjusting/processing part, and for comparing polygon vertex coordinates before and after polygon reduction processing; and a texture information allocating part for allocating, as texture information, a value in which the change corresponding to a reduction/shift distance has been corrected, assuming that the change of the texture information between surrounding polygon vertices is proportional to distance, to a polygon vertex that does not match and has been subjected to reduction or shift.

With this configuration, the data amount of the texture information can be reduced, and appropriate texture information can be generated, even when polygon vertices have been reduced or shifted by polygon reduction processing, by using the texture information for the surrounding polygon vertices, so that a three-dimensional polygon display apparatus with little deterioration of the object appearance can be provided.

A computer-readable recording medium in accordance with the present invention stores progressive polygon data used in a three-dimensional polygon display apparatus, and a data structure for texture information of the progressive polygon data comprises texture information for polygon vertices that are developed into two dimensions by virtually cutting a portion of a three-dimensional polygon.

With this configuration, the data amount can be reduced considerably, because the data structure comprises n units of texture information plus $\alpha$ units of texture information for the polygon vertices that have been added by cutting, that is n+$\alpha$ units of texture information, compared to 6n units of texture information that are necessary in the prior art.

A three dimensional polygon display apparatus using progressive polygon data stored in this computer-readable recording medium comprises a polygon front/reverse side recognition part, which calculates the vector product between all polygon vertices in each polygon surface formed of the polygon vertices, which have been developed into two dimensions for texture mapping, and recognizes only the polygon surfaces that are formed of polygon vertices whose vector products are positive, wherein the polygon surfaces comprising polygon vertices that are divided into a plurality of polygon vertices when the three-dimensional polygon is virtually cut for the creation of an object from said progressive polygon data are formed correctly.

With this configuration, the correct polygon surface can be determined from the polygon vertices that have been developed into two dimensions, and texture mapping can be performed correctly.

A three-dimensional polygon display apparatus using progressive polygon data stored in this computer-readable recording medium comprises a polygon surface recognition part, which calculates a sum of a height and a width of each polygon surface formed of the polygon vertices, which have been developed into two dimensions for texture mapping, and recognizes, of a plurality of polygon surfaces, those polygon surfaces with the smallest sum as the correct surfaces, wherein, the polygon surfaces comprising polygon vertices that are divided into a plurality of polygon vertices when the three-dimensional polygon is virtually cut for the creation of an object from said progressive polygon data are formed correctly.

With this configuration, the correct polygon surface can be determined from the polygon vertices that have been developed into two dimensions, and texture mapping can be performed correctly.

A computer-readable recording medium in accordance with the present invention stores a program for realizing a three-dimensional polygon display apparatus using progressive polygon data, the program comprising an object portion specifying step for specifying portions of the object to divide the object into object portions; and a polygon reduction adjusting/processing step for adjusting the extent to which polygon reduction processing is performed on the object portions that have been specified in said object portion specifying step and executing the polygon reduction processing; wherein, if the amount of polygon data for the object is reduced by polygon reduction processing, the extent to which the amount of polygon data is reduced can be set for each portion of the object.

With this configuration, using a computer, the influence of polygon reduction processing on object portions with detailed shape and high conspicuity can be reduced, and a three dimensional polygon display apparatus with little deterioration of the object appearance when the number of polygons is reduced can be provided.

It is preferable that the program further stored on this recording medium comprises a texture information adjusting/processing step for maintaining coordinates and texture information relating to polygon vertices before polygon reduction processing and for creating texture information relating to polygon vertices after polygon reduction processing; said texture information adjusting/processing step comprising a polygon vertex comparison processing step for acquiring coordinates of polygon vertices after polygon reduction processing with said polygon reduction adjusting/processing step, and for comparing polygon vertex coordinates before and after polygon reduction processing; and a texture information allocating/processing step for allocating stored texture information unchanged to matching polygon vertices as a result of a comparison of coordinates, and for appropriating and allocating texture information, that corresponds to the polygon vertex with the coordinates that are the closest before reduction or shift, to a polygon vertex that does not match and has been subjected to reduction or shift.

With this configuration, the data amount of the texture information in a computer can be reduced, and approximate texture information can be generated even when polygon vertices have been reduced or shifted by polygon reduction processing, so that a three-dimensional polygon display apparatus with little deterioration of the object appearance can be provided.

It is preferable that the program stored on this recording medium further comprises a texture information adjusting/processing step for maintaining coordinates and texture information relating to polygon vertices before polygon reduction processing and for creating texture information relating to polygon vertices after polygon reduction processing; said texture information adjusting/processing step comprising a polygon vertex comparison processing step for acquiring coordinates of polygon vertices after polygon reduction processing with said polygon reduction adjusting/processing step, and for comparing polygon vertex coordinates from before and after polygon reduction processing; and a texture information allocating/processing step for allocating stored texture information unchanged to matching polygon vertices as a result of a comparison of coordinates, and for assigning as texture information a value in which the change corresponding to a reduction/shift distance has been corrected, assuming that the change of the texture information between surrounding polygon vertices is proportional to their distance, to a polygon vertex that does not match and has been subjected to reduction or shift.

With this configuration, the data amount of the texture information in a computer can be reduced, and appropriate texture information can be generated, even when polygon vertices have been reduced or shifted by polygon reduction processing, by using the texture information for the surrounding polygon vertices, so that a three-dimensional polygon display apparatus with little deterioration of the object appearance can be provided.

BRIEF DESCRIPTION OF THE DRAWINGS

FIG. 1 is an outline of the configuration of the three-dimensional polygon display apparatus according to a first embodiment of the present invention.

FIG. 5 is a flowchart showing the process steps of polygon reduction adjusting/processing part 30a.

FIG. 16 illustrates an example of how a three-dimensional polygon is developed into two dimensions.

DESCRIPTION OF THE PREFERRED EMBODIMENTS

The following is a description of embodiments of three-dimensional polygon display apparatus according to the present invention, with reference to the accompanying drawings.

First Embodiment

A three-dimensional polygon display apparatus according to the first embodiment of the present invention divides the displayed object into portions; the extent to which polygon reduction processing is performed can be changed and/or adjusted for each object portion. In particular, this first embodiment employs the following method for adjusting each object portion: The size of each object portion is changed before the polygon reduction processing, then polygon reduction processing is performed to a uniform extent with respect to each object portion. To illustrate this first embodiment, a dinosaur is taken for the object to be displayed, and the dinosaur's teeth are the above-mentioned detailed, protruding portions.

Figure 2:
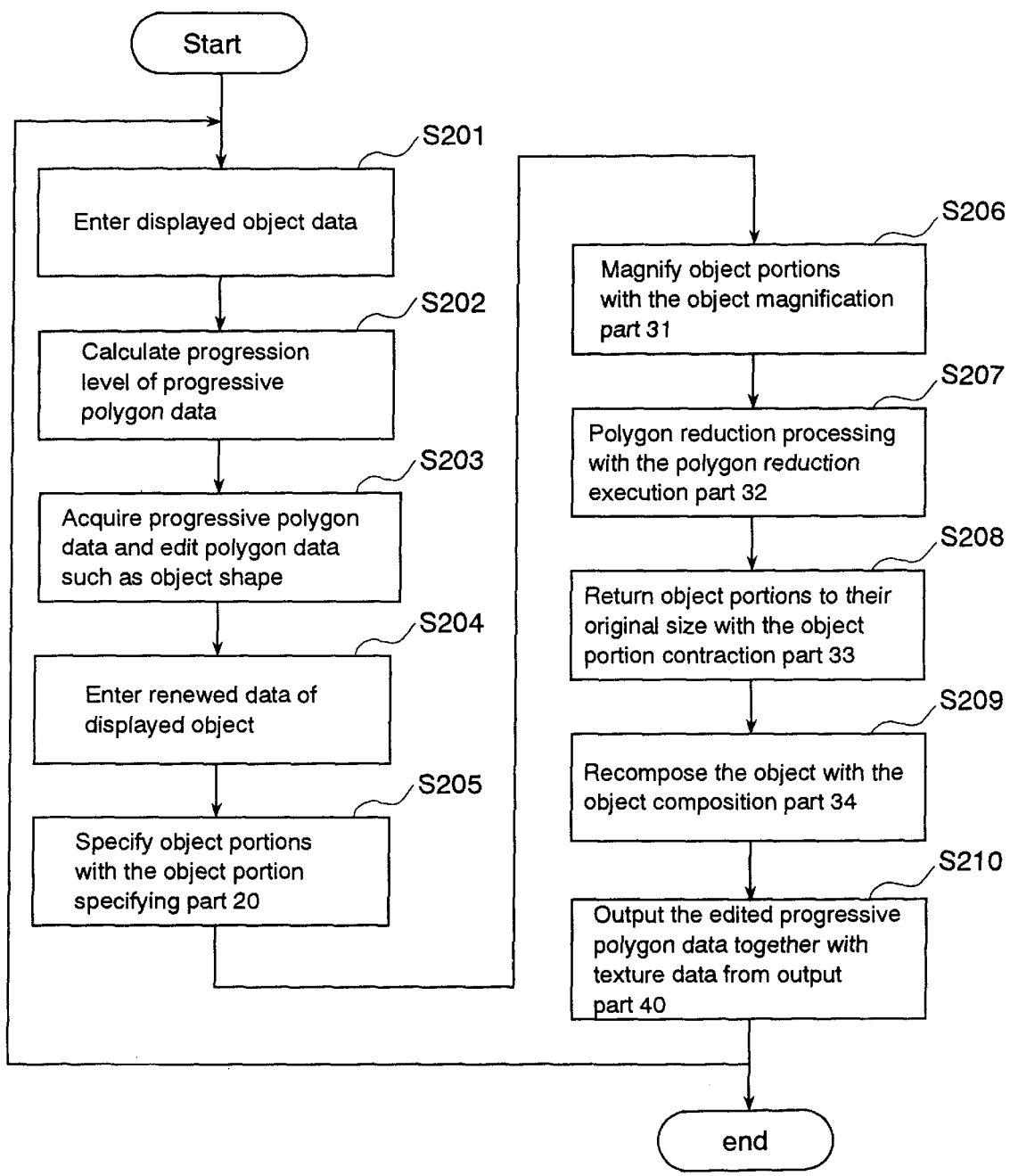
FIG. 2 is a flowchart showing the entire process flow in the three-dimensional polygon display apparatus according to the first embodiment of the present invention.

The configuration of a three-dimensional polygon display apparatus according to the first embodiment and the entire process flow of the apparatus is explained with reference to the drawings. FIG. 1 is an outline of the configuration of this apparatus. FIG. 2 shows the entire process flow in this apparatus as a flowchart.

As is shown in FIG. 1, the three-dimensional polygon display apparatus according to the first embodiment comprises an input part 10, an object portion specifying part 20, a polygon reduction adjusting/processing part 30, an output part 40, a controller 50, and a progressive-polygon-data storage 60. Moreover, it is not shown in the drawing, but it is assumed that the entire system is equipped with the memory and devices necessary to control all processes.

All information concerning the displayed object, such as its name, position, orientation, resolution etc., is input via the input part 10. The object portion specifying part 20 serves for specifying the object portions of the object. The polygon reduction adjusting/processing part 30 serves for adjusting the extent of polygon reduction processing for all the divided object portions.

The polygon reduction adjusting/processing part 30 comprises an object magnification part 31, a polygon reduction executing part 32, an object portion contraction part 33, and an object composition part 34. The object magnification part 31 changes the size of the object portions that have been specified by the object portion specifying part 20. The polygon reduction executing part 32 performs the polygon reduction processing for the object portions that have been magnified by the object magnification part 31. The object portion contraction part 33 contracts the object portions that have been polygon-reduction-processed to their original size before the magnification. The object composition part 34 stores the object portions that have been contracted to their original size in their original locations of the object before the division, and thus recomposes the object.

The output part 40 outputs the polygon data after the polygon reduction processing. The output polygon data is then combined with texture mapping data and stored into a file, or rendered by a rendering system (not shown in the drawing).

The progressive-polygon-data storage 60 stores the progressive polygon data for all objects. Here, "progressive polygon data" means, as described for the prior art, polygon data that has progression levels in accordance with the level of resolution and detail of the object display. The progressive polygon data comprises basic polygon data consisting of the coarsest level serving as a base, and detailed polygon data that is described in relation to the basic polygon data.

The following describes the entire process flow of a three-dimensional polygon display apparatus according to the present invention with reference to FIG. 2.

First of all, data concerning the displayed object, such as its name, display position, resolution etc. is entered into the input part 10 (step S201). In addition to this data, it is also possible to enter information concerning the amount of polygon data that can be assigned to this object. This can be, for example, information about the amount of polygon data assigned to each object when a plurality of objects is displayed in a certain scene.

Then, the controller 50 calculates the progression level of the progressive polygon data from the information about the displayed object, such as its position, resolution, etc. (step S202). The more to the front the display position, the more detailed the level of the progressive polygon data is; and the higher the resolution, the more detailed the level of the progressive polygon data is. This value can be calculated automatically or assigned manually by the user.

Next, the controller 50 acquires the progressive polygon data from the progressive-polygon-data storage 60, based on the object name and the progression level, and edits the polygon data in accordance with the object orientation and shape (step S203). In this example, the object is a dinosaur as illustrated in FIG. 3a.

Next, renewed data about the displayed object is entered via the input part 10 (step S204). In this example, the object position is changed towards a distant location on the screen. In other words, the displayed object is subjected to a contraction.

Then, polygon reduction processing is performed (steps S205–S209). This process is performed in a manner that the amount of polygon data is reduced without deterioration of the appearance, even when the displayed object is contracted and the resolution lowered.

For this polygon reduction processing, the progression level of the progressive polygons is changed and the amount of polygon reduction is adjusted in accordance with a linear movement of the object. A possible adjustment method is to establish, for example, a relation between the position of the displayed object and the progression level, i.e. to make the progression level coarser the more distant the display position. Another method is to establish a relation between the viewing angle towards the object and the progression level, i.e. to make the progression level coarser the smaller the viewing angle with respect to the object. These relations can be adjusted and set in accordance with experimental values or the user's preferences.

However, at coarser levels, a problem occurs when the level of the progressive polygon data is changed for the entire object as a whole to perform polygon reduction: Fine, slender, detailed object portions, such as teeth or fingers, have a high polygon progression level. Therefore, these detailed object portions are among the first features that are destroyed when performing polygon reduction, although they are important portions with high conspicuity.

The present invention solves this problem with the following procedure. First of all, the object portion specifying part 20 divides the object into object portions (step S205). The divided object portions are treated as skeleton data. Here, "skeleton" is a concept for expressing the movement of an object connected by joints in a regular three-dimensional CG process.

Then, the object magnification part 31 magnifies and adjusts the object portions (step S206). In this example, the teeth of the object are treated as skeleton data, so that they can be magnified by skeleton scaling. The following is an explanation of how the magnification ratio is set. The magnification ratio is set in accordance with the conspicuity and the importance of the corresponding object portion.

A first method to set the magnification ratio is to specify object portions of the object as reference portions (for example the eyes), and to adjust the magnification ratio in a manner that the polygons of detailed object portions (for example the teeth) are of the same size as the polygons of the reference portion. The object portion including the eyes, which serves as the reference portion, for example, consists of a plurality of polygon groups. These polygons are sorted by their surface area, and the surface area (Se) of the polygon in the middle of the sorted array (referred to as the "median polygon" below) is determined. In other words, the surface area Se corresponds more or less to the average surface area of the polygons forming the eyes. Then, the polygon groups forming a detailed object portion, such as the teeth, are sorted and the surface area (Sd) of their median polygon is determined. The shape of the teeth is finer than the shape of the eyes, so that the surface area Sd of their median polygon is smaller than the surface area Se of the median polygon of the eyes. The size of the polygons for the teeth is then expanded to the size of the polygons for the eyes. In other words, the magnification ratio A is set to A=Se/Sd.

A second method to set the magnification ratio is to determine the surface area of the median polygon of the small polygons that become the object for polygon reduction processing, and magnify this detailed object portion to a size where the detailed object portion does not become an object for polygon reduction:

First of all polygon reduction processing is performed for the entire object while counting the number of polygon reductions. The number of reductions (S) until there is an influence on the detailed object portions, and the number of reductions (E) until the appearance of the shape is lost is determined. Then, the surface area (SSd) of the teeth when S reductions have been performed, and the surface area (ESd) of the teeth when E reductions have been performed is determined. This means that up to S polygon reductions mainly fine polygons with a surface area of less than SSd are reduced, and up to E polygon reductions mainly fine polygons with a surface area of less than ESd are reduced. Consequently, if the magnification ratio for the polygon group for the teeth is such that the surface area Sd of the median polygon for the teeth is previously magnified to a surface area of, for example, Esd or (SSd+ESd)/2, the polygon group for the teeth that would have been destroyed without this adjustment will not be destroyed. Thus, a magnification ratio A of, for example, A=ESd/Sd, or A={(SSd+ESd)/2}/Sd is selected.

A third method to set the magnification ratio is to allow the user to select it when he makes the model or produces the animation. In this case, the user selects the relation between the display position and the magnification ratio for each object portion when he makes the model, and attaches this information to the model. Moreover, the user can enter the magnification ratio, for example, via the input part 10, and adjustment while seeing the actual displayed result are possible.

Figure 3B:
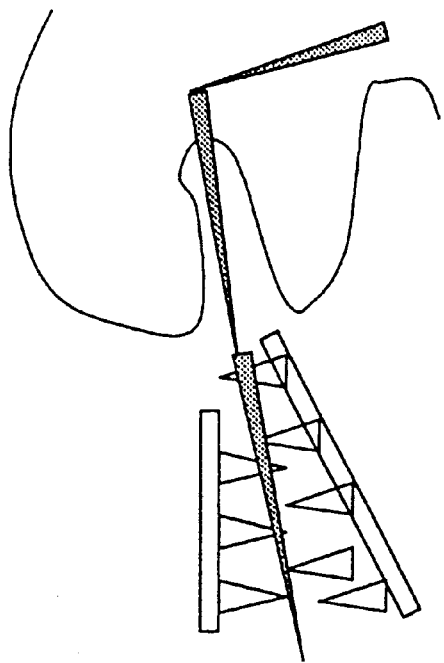
FIG. 3 shows an example of magnification and adjustment of an object portion.
Figure 3A:
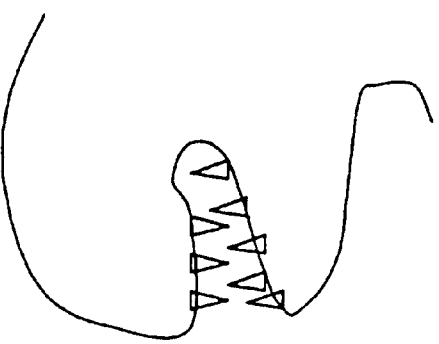

The above-described methods for setting the magnification ratio adjust and magnify (for example four times) the object portion of the teeth as an important portion with high conspicuity, as shown in FIG. 3b.

Next, the polygon reduction execution part 32 performs polygon reduction processing (step S207). The progression level is shifted on the basis of the relation between the progression levels corresponding to the object display position.

The polygon reduction processing is performed to a uniform extent on the object portions, which have been adjusted to the size shown in FIG. 3b. Therefore, the distance between neighboring progressive polygon data in the magnified object portion becomes larger when the magnification ratio is larger. This means that the level of detail for the progressive polygon data is lowered in just this portion (to a coarser level). In other words, when the magnification of the object portion constituting the teeth is sufficient, the polygon reduction processing is performed starting with detailed portions, so that it has only little influence of the teeth and polygon reduction processing on the dinosaur's body is performed with higher priority.

Next, the object portion contraction part 33 returns the object portions that have been magnified in step S206 to their original size (step S208). Same as for the magnification, the object portion for the teeth can be reduced by skeleton scaling.

Figure 3C:
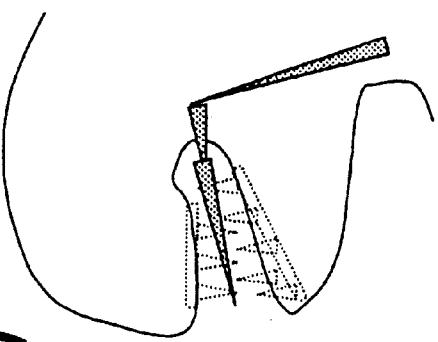

Then, the object composition part 34 recomposes the object by returning the object portions that have been divided in step S205 to their original positions (step S209), as shown in FIG. 3c. With these steps S205–S209, the extent to which polygon reduction processing is performed can be adjusted for each object portion.

The controller 50 receives the progressive polygon data on which polygon reduction processing has been performed from the polygon reduction adjusting/processing part 30, performs an object editing process on the object that has been fitted into the object display position, and outputs the progressive polygon data together with, for example, texture data via the output part 40 (step S210).

If necessary, the steps S201–S210 can be repeated.

The above-described system configuration and process flow provide a three-dimensional polygon display apparatus where the extent of the polygon data reduction can be varied and adjusted individually for each object portion.

It is preferable that the data is created for each object portion that the object producer (for example the animator) divides at the design stage based on the object division of the object portion specifying part 20.

Second Embodiment

As in the first embodiment, the three-dimensional polygon display apparatus according to the second embodiment divides the displayed object into portions, and can change and adjust the extent to which the amount of polygon data for each object portion is reduced by polygon reduction processing. In the second embodiment, however, the adjustment method individually specifies the extent of polygon reduction processing for each object portion. In the following example, the displayed object is a dinosaur, whose teeth are fine, protruding portions, and the extent of polygon reduction processing for the object portion including the dinosaur's teeth is taken to be zero. In other words, it is specified that no polygon reduction processing is performed for the dinosaur's teeth.

The configuration of a three-dimensional polygon display apparatus according to the second embodiment and the entire process flow of the apparatus is explained with reference to the drawings.

Figure 4:
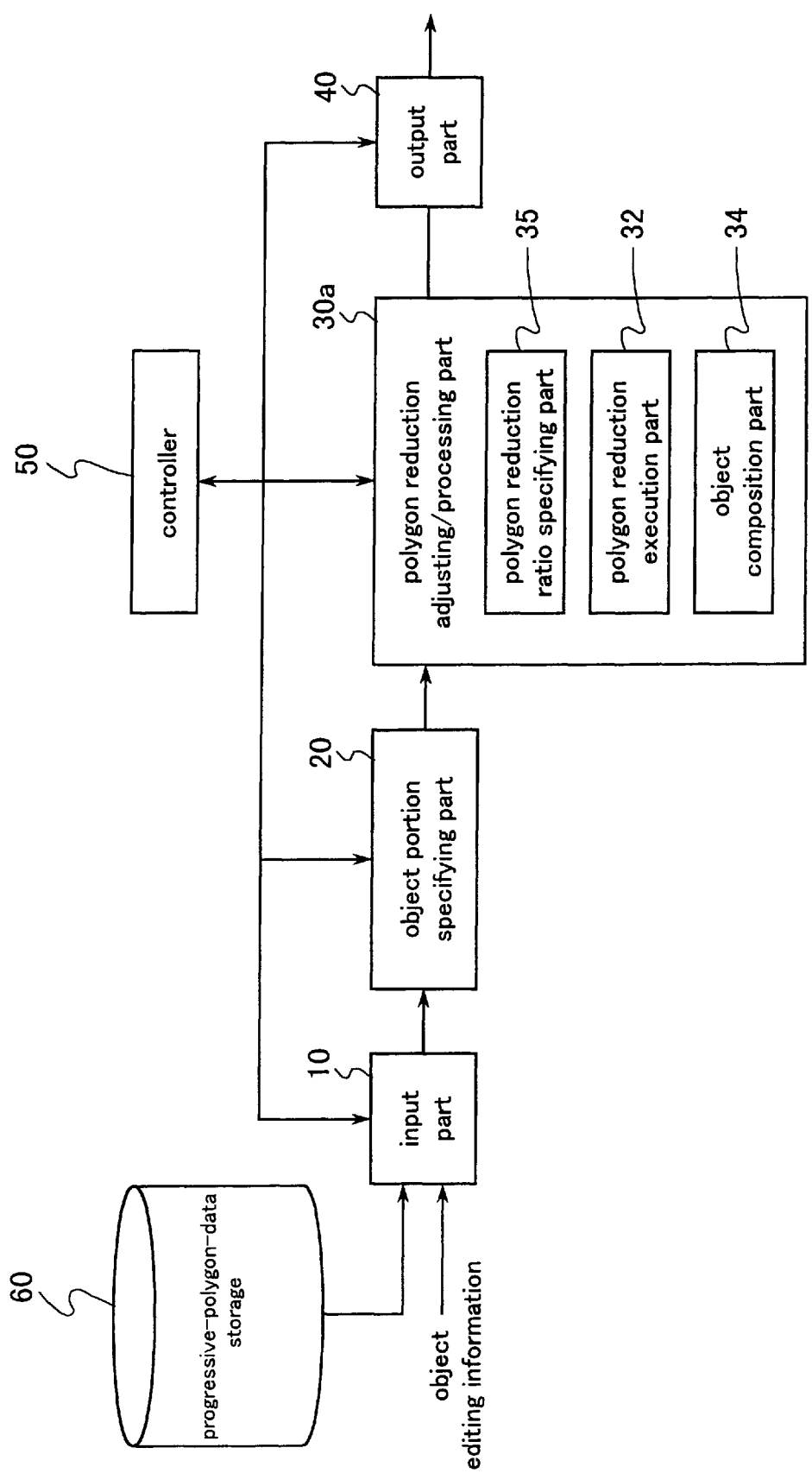
FIG. 4 is an outline of the configuration of the three-dimensional polygon display apparatus according to a second embodiment of the present invention.

FIG. 4 is an outline of the configuration of the three-dimensional polygon display apparatus according to the second embodiment. As is shown in FIG. 4, the apparatus of the second embodiment comprises a polygon reduction adjusting/processing part 30a in substitution for the polygon reduction adjusting/processing part 30 of the first embodiment. Other than the polygon reduction adjusting/processing part 30a, the structural elements of this embodiment bear the same numbers and are the same as the structural elements of the first embodiment, so that their explanation has been omitted. The following is primarily an explanation of the polygon reduction adjusting/processing part 30a. As in the first embodiment, it is not shown in the drawing, but it is assumed that the entire system is equipped with the memory and devices necessary to control all processes.

The polygon reduction adjusting/processing part 30a comprises a polygon reduction ratio specifying part 35, a polygon reduction execution portion 32, and an object composition part 34. The polygon reduction ratio specifying part 35 serves for setting the polygon reduction ratio individually for all object portions into which the object portion specifying part 20 has divided the object. The polygon reduction ratio is the ratio of the number of polygons reduced by this embodiment over the number of polygons reduced by regular polygon reduction processing. When the polygon reduction ratio is 0.5, the number of reduced polygons is one half the number reduced by regular polygon reduction processing. When the polygon reduction ration is 0, this means that no polygon reduction is performed. This polygon reduction ratio can be selected for each object when the object model is conceived, or it can be maintained and managed as additional information.

The polygon reduction execution part 32 performs polygon reduction processing of the object portions on the basis of the polygon reduction ratio specified by the polygon reduction ratio specifying part 35. The object composition part 34 saves the divided object portions after the polygon reduction processing at their original position, and thus recomposes the object.

Figure 5:
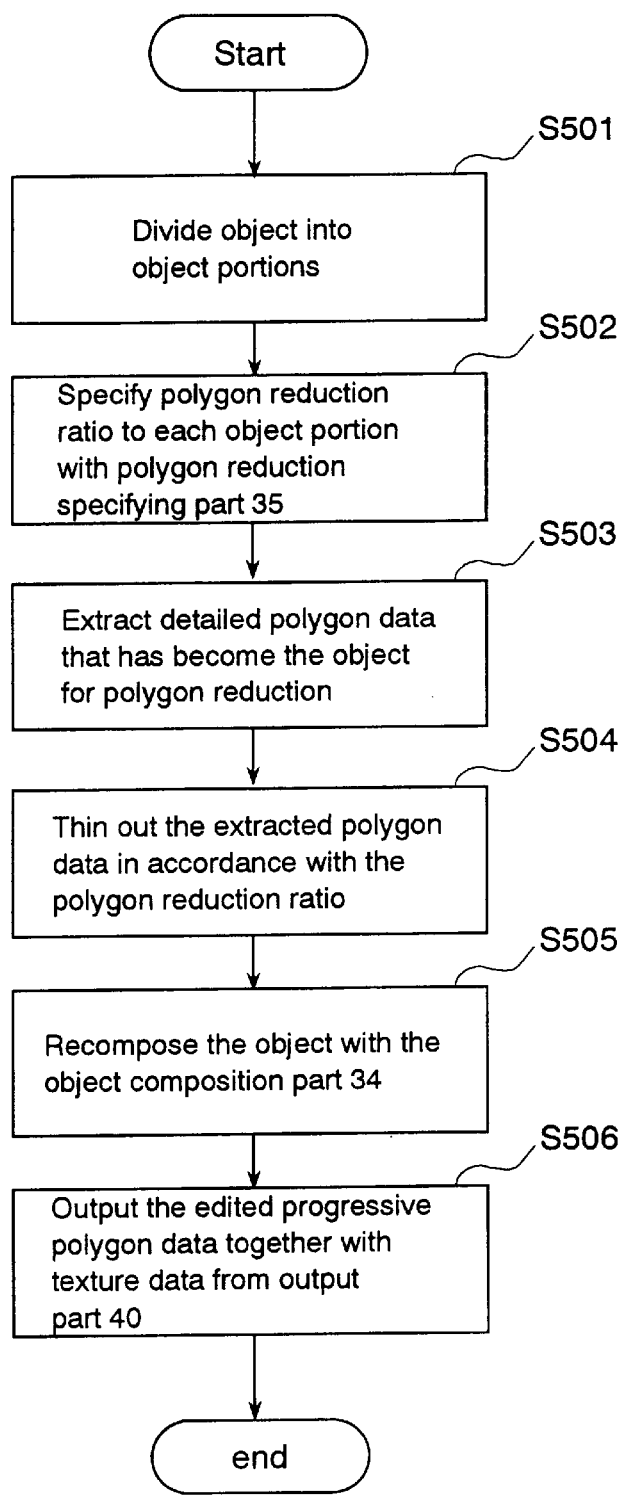

FIG. 5 illustrates the processing steps of the polygon reduction adjusting/processing part 30*a*. The processing steps of the other parts are the same as the processing steps in FIG. 2 of the first embodiment, so that their explanation has been omitted.

First of all, as has been explained for the first embodiment, the progressive polygon data of the object, its renewed display position, resolution, and progression level after renewal is obtained as a precondition.

Figure 6:
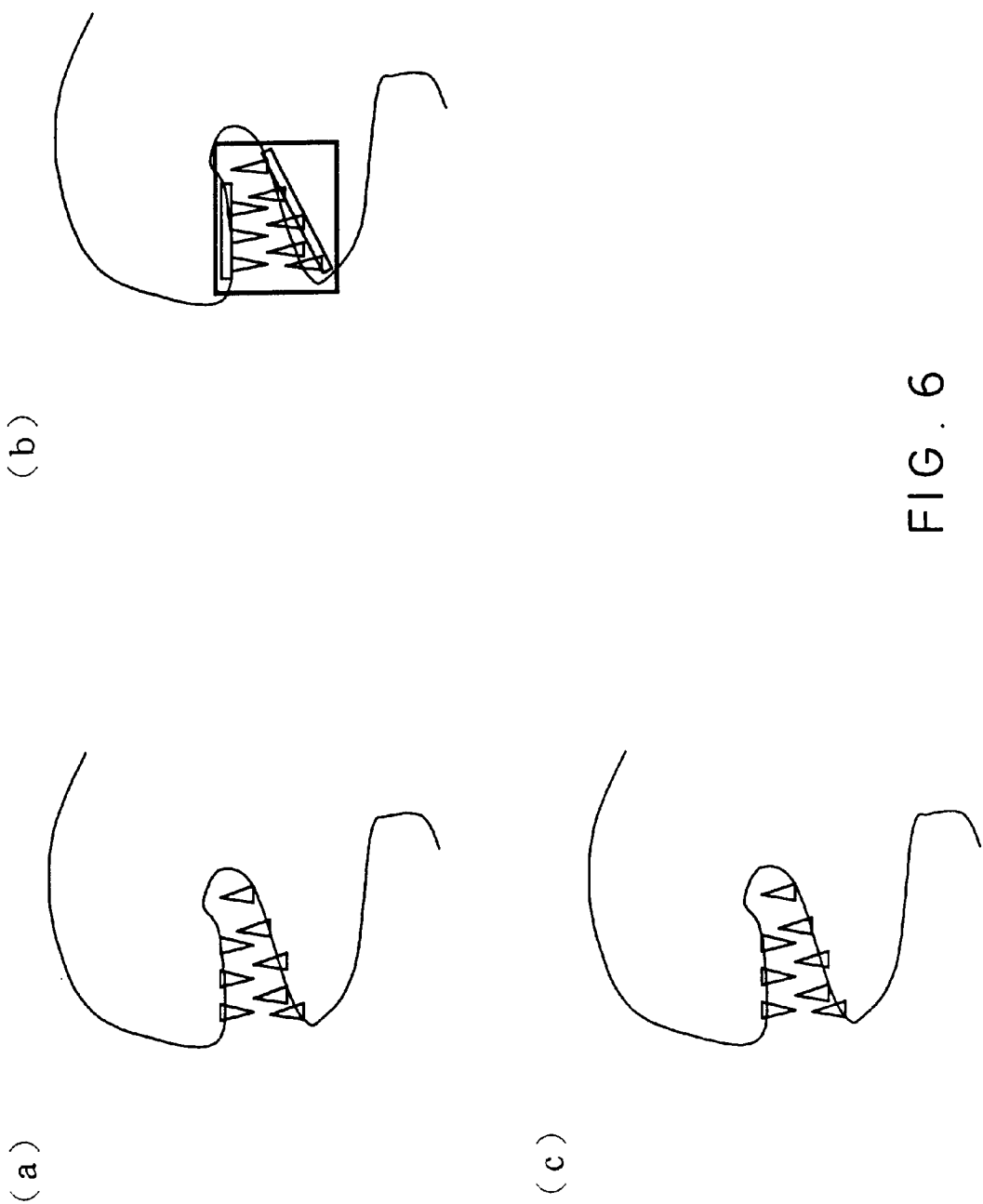
FIG. 6 shows an example for the settings for the thinning-out ratio for the polygon reduction processing of the object portion.

First, the object portion specifying part 20 divides the object into object portions (step S501). As is shown in FIG. 6*b*, the dinosaur is divided into object portions for its body and its teeth.

Then, the polygon reduction ratio specifying part 35 specifies a polygon reduction ratio to each object portion in accordance with its conspicuity and importance (step S502). In this example, a polygon reduction ratio of "0" is assigned to the dinosaur's teeth, which means that no polygon reduction is performed on them. A polygon reduction ratio of "1" is assigned to the dinosaur's body, which means that a regular polygon reduction is performed. The specified polygon reduction ratios are passed on to the polygon reduction execution part 32.

Moreover, when a polygon reduction ratio already has been selected as additional information for the progressive polygon data, the polygon reduction ratio specifying part 35 extracts this additional information and passes it on to the polygon reduction execution part 32.

Next, the polygon reduction execution part 32 performs the polygon reduction processing (step S503–S504).

First of all, as in step S207, the polygon reduction execution part 32 shifts the current progression level to the progression level corresponding to the renewed display position, based on the relation between the progression level to the display position of the object. This progression level shift extracts the detailed polygon that has become the object for polygon reduction (step S503).

Next, in accordance with the selected polygon reduction ratio, a number of polygons is thinned out from the extracted detailed polygon data (step S504). This thinning out is performed with priority for polygon data of a high (detailed) progression level. Because the polygon reduction ratio for the teeth is "0", no thinning out of the corresponding progressive polygon data is performed, and because the polygon reduction ratio for the body is "1", the extracted detailed polygon data is completely thinned out.

Then, the object composition part 34 recomposes the object by returning the object portions that have been divided in step S501 to their original positions (step S505), as shown in FIG. 6*c*.

As in the first embodiment, the controller 50 receives the progressive polygon data on which polygon reduction processing has been performed from the polygon reduction adjusting/processing part 30, performs an object editing process on the object that has been fitted into the object display position, and outputs the progressive polygon data together with, for example, texture data via the output part 40 (step S506).

Thus, the above steps S501–S506 can adjust the extent of polygon reduction processing for each object portion.

As has been explained above, the present invention provides a three-dimensional polygon display apparatus where the extent of the polygon data reduction can be varied and adjusted individually for each object portion.

Third Embodiment

The three-dimensional polygon display apparatus according to the third embodiment can not only perform polygon reduction processing for portions on the outer surface of the object, but also for object portions hidden inside the object (referred to as "internal object portions" below). This solves the problem that polygon reduction processing could only be performed for the outer surface of the object, and not for internal object portions. The processing method of the third embodiment is to divide the object into object portions, and perform polygon reduction processing after the internal object portions have been brought to the surface. In the following example, a dinosaur is the displayed object, and the dinosaur's teeth are the internal object portions.

The overall configuration of a three-dimensional polygon display apparatus according to the third embodiment and the process flow of the apparatus is explained with reference to the drawings.

Figure 7:
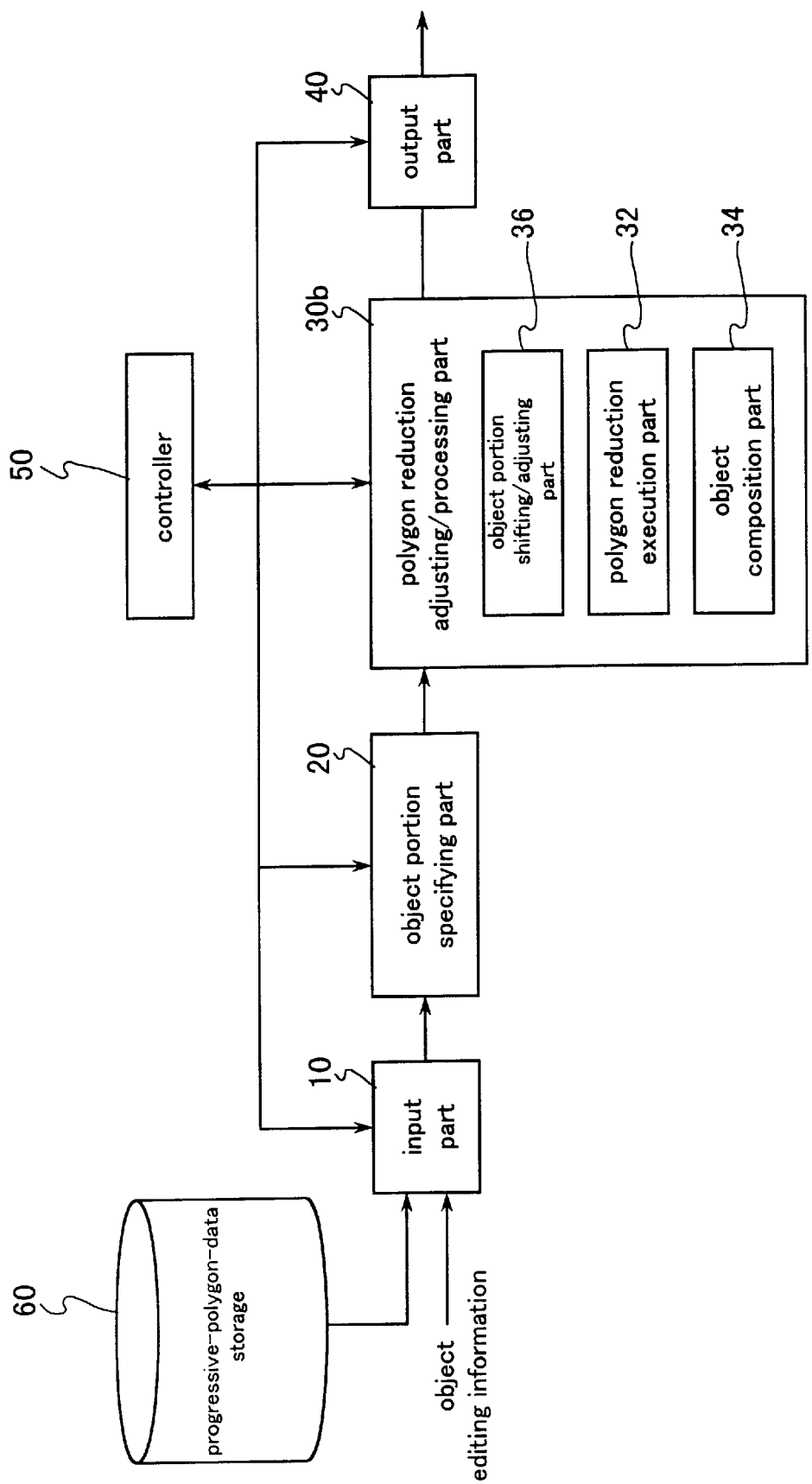
FIG. 7 is an outline of the configuration of the three-dimensional polygon display apparatus according to a third embodiment of the present invention.

FIG. 7 is an outline of the configuration of the three-dimensional polygon display apparatus according to the third embodiment. As is shown in FIG. 7, the apparatus of the third embodiment comprises a polygon reduction adjusting/processing part 30*b* in substitution for the polygon reduction adjusting/processing part 30 of the first embodiment. Other than the polygon reduction adjusting/processing part 30*b*, the structural elements of this embodiment bear the same numbers and are the same as the structural elements of the first embodiment, so that their explanation has been omitted. The following is primarily an explanation of the polygon reduction adjusting/processing part 30*b*. As in the first embodiment, it is not shown in the drawing, but it is assumed that the entire system is equipped with the memory and devices necessary to control all processes.

Figure 9B:
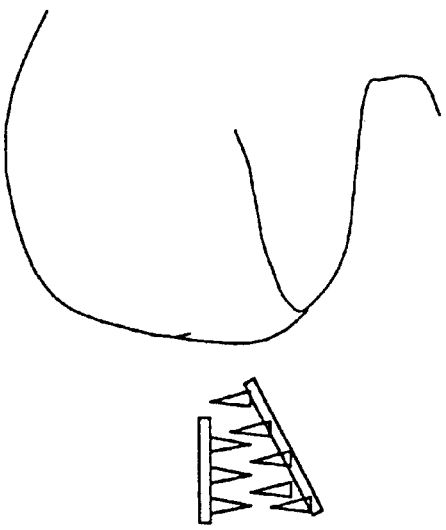
FIG. 9 illustrates an example of how an object portion hidden inside the object is rearranged at the outside.
Figure 9A:
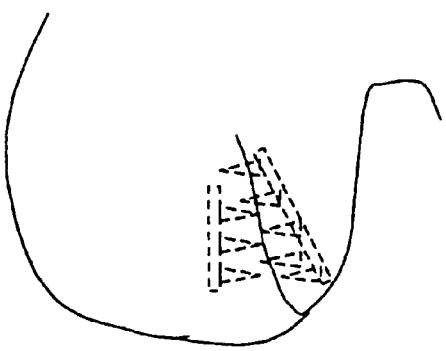

The polygon reduction adjusting/processing part 30*b* comprises an object portion specifying part 20, an object portion shifting/adjusting part 36, a polygon reduction execution part 32, and an object composition part 34. The object portion shifting/adjusting part 36 adjusts and rearranges the relative positions of the object portions specified by the object portion specifying part 20 in a manner that they do not overlap, and brings objects that are enclosed inside the object (referred to as "enclosed objects" below) to the outside. In other words, it brings out the teeth through the body, as shown in FIG. 9*b*.

The polygon reduction execution part 32 performs polygon reduction processing for each object portion. The object composition part 34 stores the divided object portions after the polygon reduction processing in their original locations of the object before the division, and thus recomposes the object.

Figure 8:
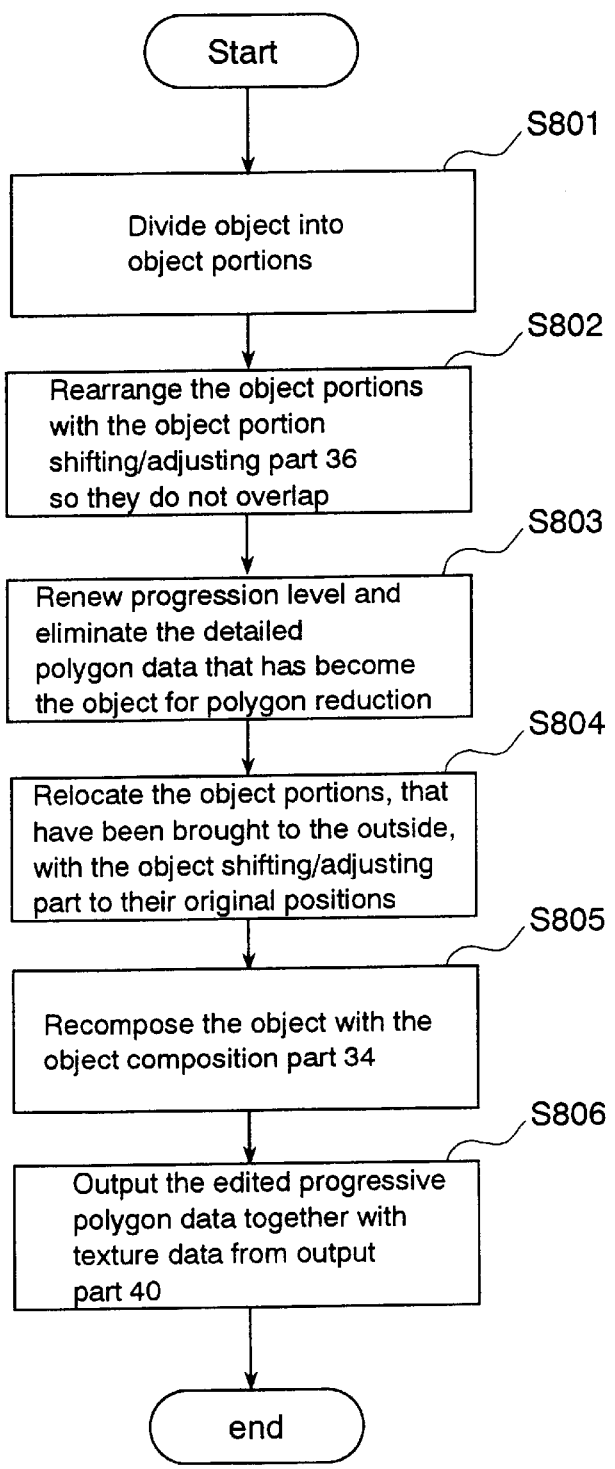
FIG. 8 is a flowchart showing the process steps of polygon reduction adjusting/processing part 30b.

FIG. 8 illustrates the processing steps of the polygon reduction adjusting/processing part 30*b*. The processing steps of the other parts are the same as the processing steps in FIG. 2 of the first embodiment, so that their explanation has been omitted.

First of all, as has been explained for the first embodiment, the progressive polygon data of the object, its renewed display position, resolution, and progression level after renewal is obtained as a precondition.

First, the object portion specifying part 20 divides the object into object portions (step S801).

Then, the object portion shifting/adjusting part 36 rearranges the positions of the object portions so that they do not overlap (step S802). In this example, the dinosaur's teeth, which are an internal object portion hidden in the dinosaur's body, are brought to the outside, as shown in FIG. 9b.

Then, as in step S207 of the first embodiment, the polygon reduction execution part 32 shifts the current progression level with respect to the object portions that have been rearranged in step S802 to the progression level corresponding to the renewed display position, based on the relation between the progression level and the display position of the object, and eliminates the detailed polygon data that has become the object for polygon reduction (step S803).

Then, the object portion shifting/adjusting part 36 relocates the internal object portions, which have been brought to the outside, to their original positions (step S804).

Figure 9C:
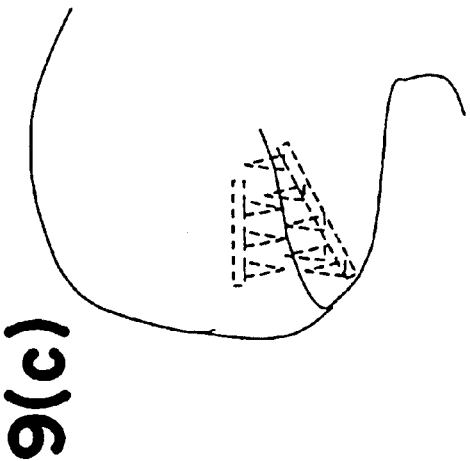

Then, the object composition part 34 recomposes the object by returning the object portions that have been divided in step S801 to their original positions (step S805), as shown in FIG. 9c.

As in the first embodiment, the controller 50 receives the progressive polygon data on which polygon reduction processing has been performed from the polygon reduction adjusting/processing part 30, performs an object editing process on the object that has been fitted into the object display position, and outputs the progressive polygon data together with, for example, texture data via the output part 40 (step S806).

Thus, with the above steps S801–S806 polygon reduction processing can be performed also for object portions that are hidden inside the object.

Thus, the present invention provides a three dimensional polygon display apparatus that can perform polygon data reduction also for object portions that are hidden inside the object.

Fourth Embodiment

As the third embodiment, the three-dimensional polygon display apparatus according to the fourth embodiment can not only perform polygon reduction processing for portions on the outer surface of the object, but also for object portions inside the object. The processing method of the fourth embodiment is to divide the object into object portions, and perform polygon reduction processing after the enclosing object has been deformed in a manner that the internal object portions is brought to the outer surface. In the following example, a dinosaur is the displayed object, the dinosaur's teeth are the internal object portions, and the enclosing object is the dinosaur's head.

The overall configuration of a three dimensional polygon display apparatus according to the fourth embodiment and the process flow of the apparatus is explained with reference to the drawings.

Figure 10:
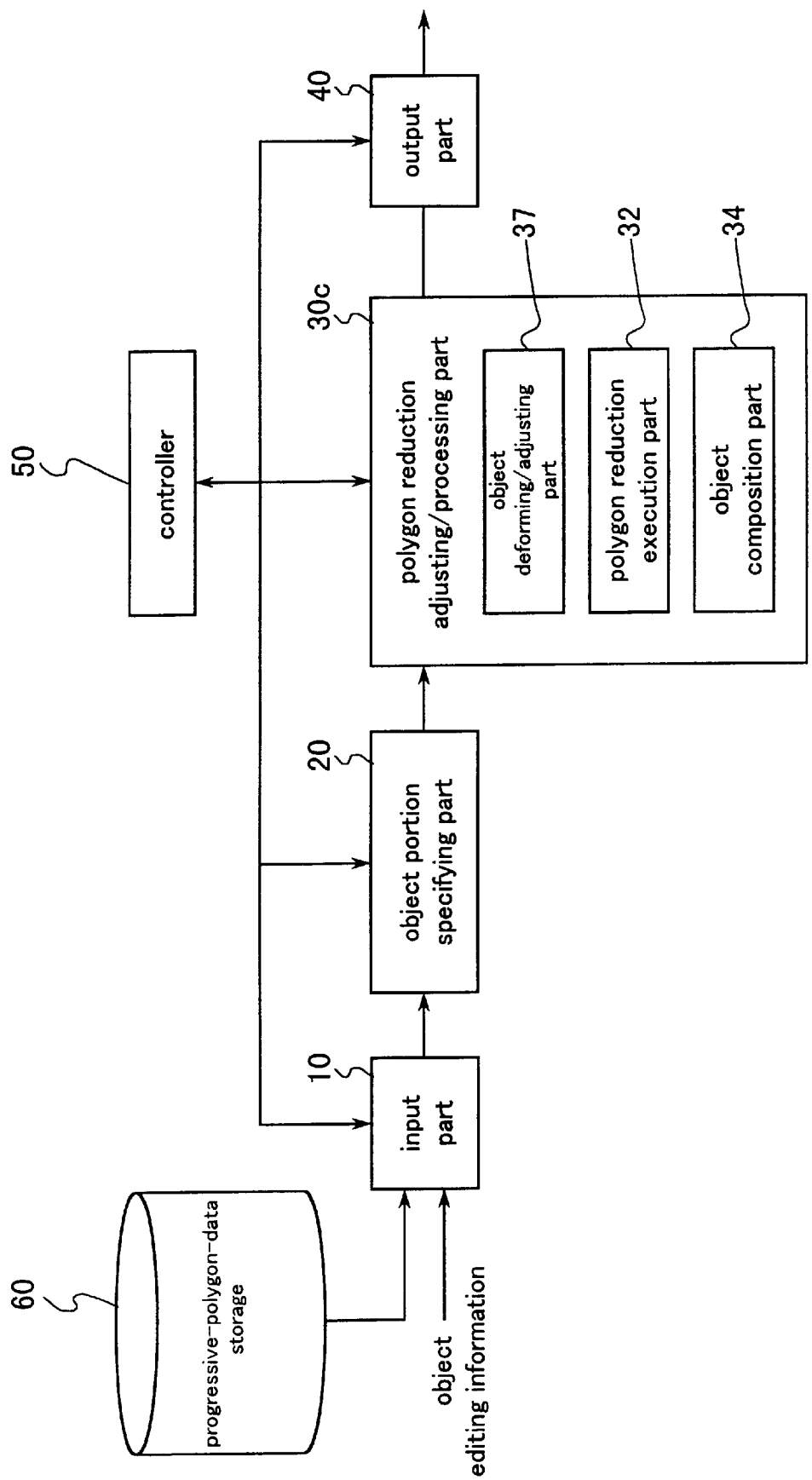
FIG. 10 is an outline of the configuration of the three-dimensional polygon display apparatus according to a fourth embodiment of the present invention.

FIG. 10 is an outline of the configuration of the three-dimensional polygon display apparatus according to the fourth embodiment. As is shown in FIG. 10, the apparatus of the fourth embodiment comprises a polygon reduction adjusting/processing part 30c in substitution for the polygon reduction adjusting/processing part 30 of the first embodiment. Other than the polygon reduction adjusting/processing part 30c, the structural elements of this embodiment bear the same numbers and are the same as the structural elements of the first embodiment, so that their explanation has been omitted. The following is primarily an explanation of the polygon reduction adjusting/processing part 30c. As in the first embodiment, it is not shown in the drawing, but it is assumed that the entire system is equipped with the memory and devices necessary to control all processes.

Figure 12B:
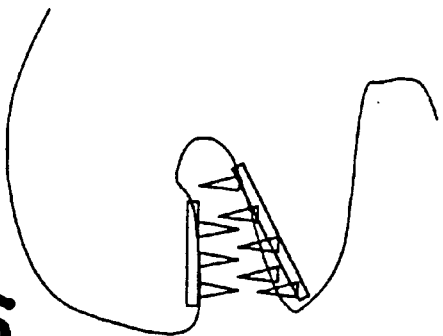
FIG. 12 illustrates an example of how an object portion hidden inside the object is exposed to the outside surface.
Figure 12A:
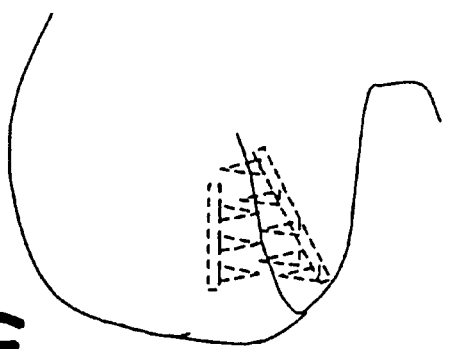

The polygon reduction adjusting/processing part 30b comprises an object portion specifying part 20, an object portion deforming/adjusting part 37, a polygon reduction execution part 32, and an object composition part 34. The object portion deforming/adjusting part 37 deforms and adjusts the object portions so that the object portions specified by the object portion specifying part 20 are brought to the outer surface. For example, the dinosaur's mouth is opened and deformed to bring the teeth to the outer surface, as shown in FIG. 12b.

The polygon reduction execution part 32 performs polygon reduction processing for each object portion. The object composition part 34 stores the divided object portions after the polygon reduction processing in their original locations of the object before the division, and thus recomposes the object.

Figure 11:
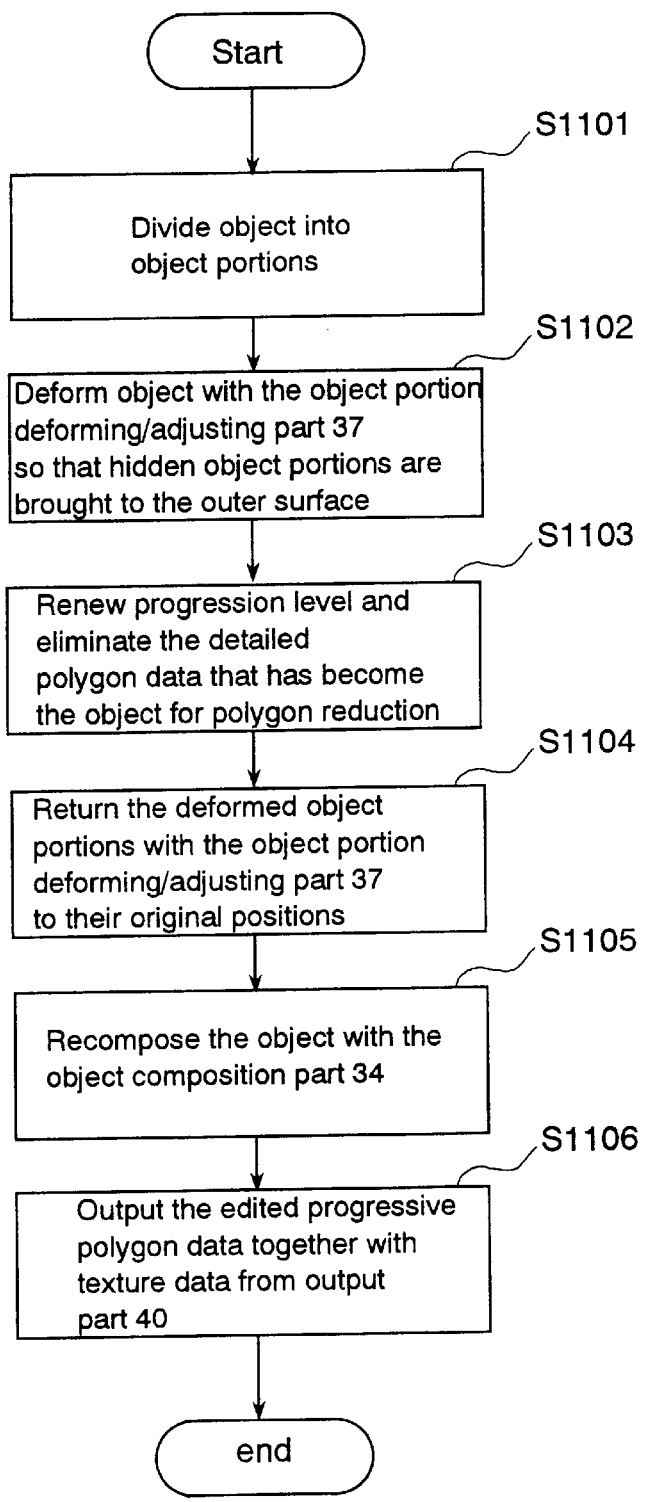
FIG. 11 is a flowchart showing the process steps of polygon reduction adjusting/processing part 30c.

FIG. 11 illustrates the processing steps of the polygon reduction adjusting/processing part 30c. The processing steps of the other parts are the same as the processing steps in FIG. 2 of the first embodiment, so that their explanation has been omitted.

First of all, as has been explained for the first embodiment, the progressive polygon data of the object, its renewed display position, resolution, and progression level after renewal is obtained as a precondition.

First, the object portion specifying part 20 divides the object into object portions (step S1101).

Then, the object portion deforming/adjusting part 37 deforms the enclosing object in a manner that the internal object portions hidden inside the object are brought to the outer surface (step S1102). In this example, the dinosaurs mouth is opened and its teeth, which are an object portion hidden inside, are brought to the outer surface, as shown in FIG. 12b.

Then, as in step S207 of the first embodiment, the polygon reduction execution part 32 shifts the current progression level with respect to the object portions that have been deformed in step S1102 to the progression level corresponding to the renewed display position, based on the relation between the progression level and the display position of the object, and eliminates the detailed polygon data that the progression level shift has turned into the object for polygon reduction (step S1103).

Then, the object portion deforming/adjusting part 37 returns the deformed object portions to their original shapes (step S1104). In this example, the dinosaur's mouth is closed, as is shown in FIG. 12c.

Figure 12C:
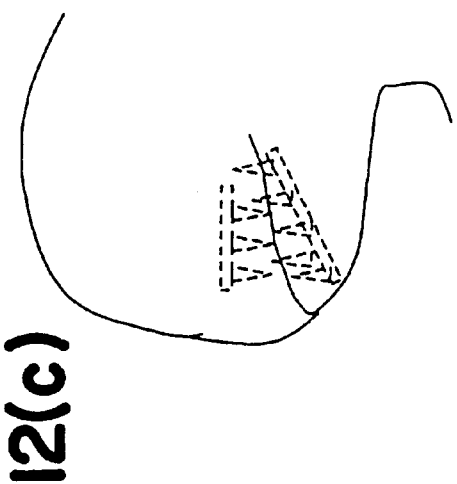

Then, the object composition part 34 recomposes the object by returning the object portions that have been divided in step S1101 to their original positions (step S1105), as shown in FIG. 12c.

As in the first embodiment, the controller 50 receives the progressive polygon data on which polygon reduction processing has been performed from the polygon reduction adjusting/processing part 30, performs an object editing process on the object that has been fitted into the object display position, and outputs the progressive polygon data together with, for example, texture data via the output part 40 (step S1106).

Thus, with the above steps S1101–S1106 polygon reduction processing can be performed also for object portions that are hidden inside the object.

Thus, the present invention provides a three-dimensional polygon display apparatus that can perform polygon data reduction also for object portions that are hidden inside the object.

Fifth Embodiment

The three-dimensional polygon display apparatus according to the fifth embodiment reduces the data amount that is necessary for texture-mapping. In the fifth embodiment, polygon reduction processing is performed to reduce the number of polygon vertices. Then, an approximate expression is attained by appropriating/interpolating the texture information of the polygon surfaces before they have subjected to polygon reduction processing to the newly formed polygon surfaces, so as to reduce the amount of data processing with regard to the texture information.

The overall configuration of a three-dimensional polygon display apparatus according to the fifth embodiment and the process flow of the apparatus is explained with reference to the drawings.

Figure 13:
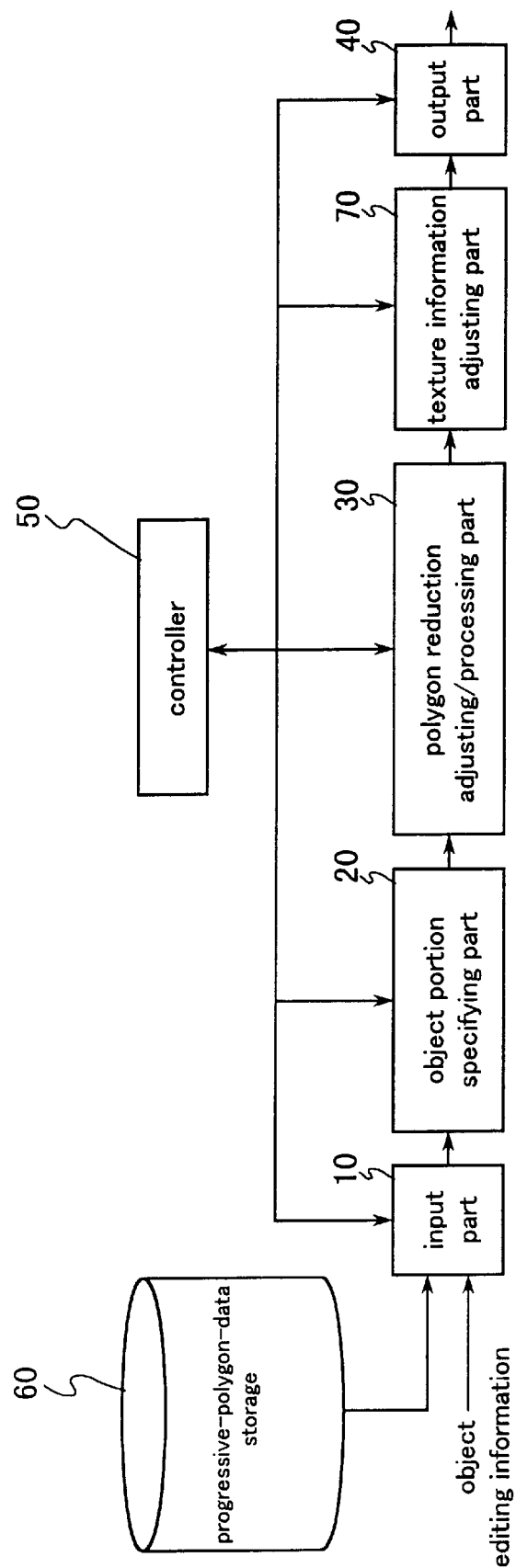
FIG. 13 is an outline of the configuration of the three-dimensional polygon display apparatus according to a fifth embodiment of the present invention.

FIG. 13 is an outline of the configuration of the three-dimensional polygon display apparatus according to the fifth embodiment. As is shown in FIG. 13, the apparatus of the third embodiment further comprises a texture information adjusting part 70 in addition to the elements of the first embodiment. Other than the texture information adjusting part 70, the structural elements of this embodiment bear the same numbers and are the same as the structural elements of the first embodiment, so that their explanation has been omitted. The following is primarily an explanation of the texture information adjusting part 70. As in the first embodiment, it is not shown in the drawing, but it is assumed that the entire system is equipped with the memory and devices necessary to control all processes.

Figure 14:
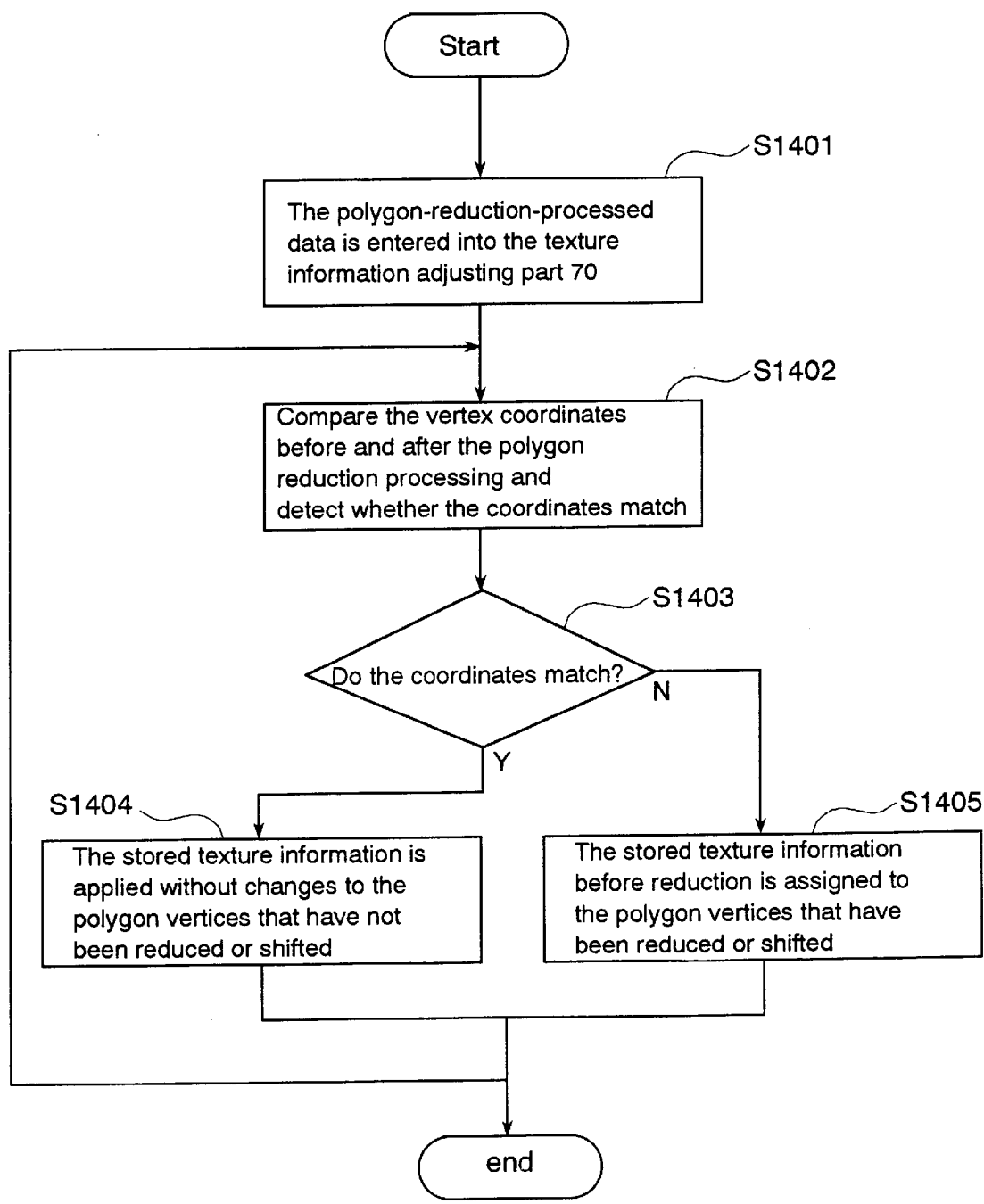
FIG. 14 is a flowchart of the process steps of the texture information adjusting part 70.

FIG. 14 explains the process steps of the texture information adjusting part 70. The processing steps of the other parts are the same as the processing steps in FIG. 2 of the first embodiment, so that their explanation has been omitted.

Figure 15:
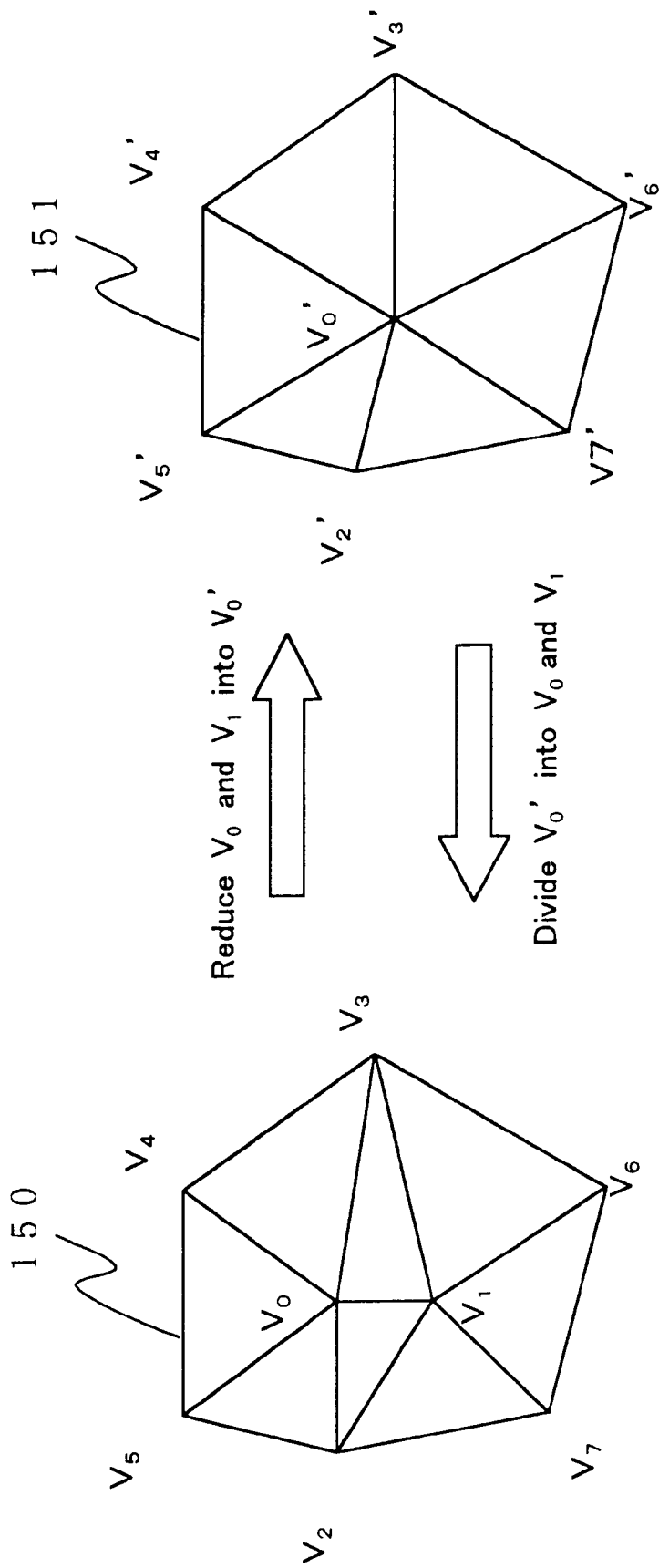
FIG. 15 illustrates an example of how the progressive polygon vertices are reduced and shifted.

First of all, as is shown in FIG. 15, the polygon reduction adjusting/processing part 30 reduces the progressive polygon vertices. The data from after the polygon reduction processing is entered into the texture information adjusting part 70 (step S1401). The texture information adjusting part 70 also stores the texture information from before the polygon reduction processing.

Next, the texture information adjusting part 70 compares the vertex coordinates from before and after the polygon reduction processing (step S1402). As a result of this comparison, it is detected whether the coordinates before the polygon reduction processing match the coordinates after the polygon reduction processing (step S1403).

The stored texture information is applied without changes to the matching vertices, i.e. the polygon vertices that have not been reduced or shifted (step S1404). The stored texture information before reduction is assigned to the not matching vertices, i.e. the polygon vertices that have been reduced or shifted (step S1405). This makes use of the fact that the appearance does not heavily deteriorate when a portion of the polygon vertices is reduced and shifted by polygon reduction processing, and the same texture information as before reduction is appropriated to the polygon vertices.

FIG. 15 illustrates this situation. Before polygon reduction processing, an object portion 150 comprises the vertices $V_0$–$V_7$. Each polygon vertex has two-dimensional texture information (U, V), for example $V_0$ has the texture information ($U_{V0}$, $V_{V0}$). At this point, the object portion is formed of eight polygon surfaces.

After polygon reduction processing, the object portion 151 comprises the vertices $V_0'$–$V_7'$. The polygon reduction processing has reduced $V_0$ and $V_1$, which have become $V_0'$. The object portion is formed of six polygon surfaces.

Since the coordinates of the polygon vertices $V_2'$–$V_7'$ have not been shifted by the polygon reduction processing, the same texture information can be applied for them. On the other hand, since there is no coordinate matching $V_0'$, a vertex is selected from the not yet reduced polygon vertices before the polygon reduction processing. If $V_0$ is selected, then the texture information ($U_{V0}$, $V_{V0}$) is assigned to ($U_{V0'}$, $V_{V0'}$).

When the progression level is raised in the direction against the polygon reduction processing, i.e. towards a more detailed level, the reverse processing to the polygon reduction processing is performed. In other words, since $V_2$–$V_7$ match $V_2'$–$V_7'$, the texture information ($U_{V2'}$, $V_{V2'}$) –($U_{V7'}$, $V_{V7'}$) can be applied unchanged, and ($U_{V0'}$, $V_{V0'}$) is applied to $V_0$ and $V_1$, since $V_0'$ is the closest to them.

Thus, the amount of data processing with regard to texture information can be reduced when polygon vertices have been shifted by polygon reduction processing.

Sixth Embodiment

As in the fifth embodiment, also the three-dimensional polygon display apparatus according to the sixth embodiment reduces the data amount that is necessary for texture-mapping. In the sixth embodiment, polygon reduction processing is performed to reduce the number of polygon vertices. Then, an approximate expression is attained by assigning an average value of texture information of the reduced and shifted polygon vertices, so as to reduce the amount of data processing with regard to the texture information.

The overall configuration of the three-dimensional polygon display apparatus according to the sixth embodiment is the same as the configuration of the fifth embodiment shown in FIG. 13, but the processing of the texture information adjusting part 70 is different from the fifth embodiment.

The texture information adjusting part 70 compares the coordinates of the vertices from before and after the polygon reduction processing. The stored texture information is applied without changes to the matching vertices, i.e. the polygon vertices that have not been shifted. An average value of texture information is calculated from the surrounding reduced polygon vertices before polygon reduction processing and assigned to the not matching vertices, i.e. the polygon vertices that have been shifted. This makes use of the fact that the average value of the texture information for reduced polygon vertices is close to the texture information of polygon vertices after reduction, when a portion of the polygon vertices have been reduced by polygon reduction processing.

As for the fifth embodiment, this situation is explained by FIG. 15. Before polygon reduction processing, an object portion 150 comprises the vertices $V_0$–$V_7$. Each polygon vertex has two-dimensional texture information (U, V), for example $V_0$ has the texture information ($U_{V0}$, $V_{V0}$). At this point, the object portion is formed of eight polygon surfaces.

After polygon reduction processing, the object portion 151 comprises the vertices $V_0'$–$V_7'$. The polygon reduction processing has reduced $V_0$ and $V_1$, which have become $V_0'$. The object portion is formed of six polygon surfaces.

Since the coordinates of the polygon vertices $V_2'$–$V_7'$ have not been shifted by the polygon reduction processing, the same texture information can be applied for them. On the other hand, since there is no coordinate matching $V_0'$, the reduced vertices $V_0$ and $V_1$ are selected from the polygon vertices before the polygon reduction processing, and their average value is calculated. In other words, (($U_{V0}$+$U_{V1}$)/2, ($V_{V0}$+$V_{V1}$)/2) is assigned to the texture information ($U_{V0}'$+$V_{V0}'$) of $V_0'$.

When the progression level is raised in the direction against the polygon reduction processing, i.e. towards a more detailed level, the same process as in the fifth embodiment is performed. In other words, since $V_2$–$V_7$ match $V_2'$–$V_7'$, the texture information ($U_{V2}'$, $V_{V2}'$)–($U_{V7}'$, $V_{V7}'$) can be applied unchanged as shown in FIG. 15, and (($U_{V0}$+$U_{V1}$)/2, ($V_{V0}$+$V_{V1}$)/2) is applied to $V_0$ and $V_1$, since $V_0'$ is the closest to them.

Thus, the amount of data processing with regard to texture information can be reduced when polygon vertices have been shifted by polygon reduction processing.

Seventh Embodiment

As in the fifth and sixth embodiments, also the three-dimensional polygon display apparatus according to the seventh embodiment reduces the data amount that is necessary for texture-mapping. In the seventh embodiment, polygon reduction processing is performed to reduce the number of polygon vertices. Then, the texture information for the new vertices is created from the texture information for the surrounding reduced polygon vertices to derive a composite value proportional to their distances.

The overall configuration of the three-dimensional polygon display apparatus according to the seventh embodiment is the same as the configuration of the fifth embodiment shown in FIG. 13, but the processing of the texture information adjusting part 70 is different from the fifth embodiment.

The texture information adjusting part 70 compares the coordinates of the vertices before and after the polygon reduction processing. The stored texture information is applied without changes to the matching vertices, i.e. the polygon vertices that have not been shifted. A composite value proportional to the distances is calculated from the texture information of the surrounding reduced polygon vertices before polygon reduction processing and assigned to the not matching vertices, i.e. the polygon vertices that have been shifted. This makes use of the fact that the extent to which object texture changes in the reduced portions is approximately uniform, so that the assigned value is the change from the texture information of the surrounding reduced polygon vertices is corrected in accordance with the distance.

As for the fifth embodiment, this situation is explained by FIG. 15. Before polygon reduction processing, an object portion 150 comprises the vertices $V_0$–$V_7$. Each polygon vertex has two-dimensional texture information (U, V), for example $V_0$ has the texture information ($U_{V0}$, $V_{V0}$). After polygon reduction processing, the object portion 151 comprises the vertices $V_0'$–$V_7'$. The polygon reduction processing has reduced $V_0$ and $V_1$, which have become $V_0'$.

Since the coordinates of the polygon vertices $V_2'$–$V_7'$ have not been shifted by the polygon reduction processing, the same texture information can be applied for them. On the other hand, since there is no coordinate matching $V_0'$, the surrounding reduced vertices $V_0$ and $V_1$ are selected from the polygon vertices before the polygon reduction processing.

First, $D_{V0}$ and $D_{V1}$ are defined as the distances from $V_0'$ to $V_0$ and $V_1$:

$$D_{V0}=[(X_{V0}'-X_{V0})^2+(Y_{V0}'-Y_{V0})^2+(Z_{V0}-Z_{V0})^2]^{1/2}$$
$$D_{V1}=[(X_{V0}'-X_{V1})^2+(Y_{V0}'-Y_{V1})^2+(Z_{V0}-Z_{V1})^2]^{1/2} \quad \text{(Eq. 1)}$$

$DD_{V0}$ and $DD_{V1}$ are defined as the ratios between $D_{V0}$ and $D_{V1}$ and the distances from $V_0$ and $V_1$ to $V_0'$:

$$DD_{V0}=D_{V0}/(D_{V0}+D_{V1})$$
$$DD_{V1}=D_{V1}/(D_{V0}+D_{V1}) \quad \text{(Eq. 2)}$$

$U_{V0}'$ and $V_{V0}'$ are defined as the composite value of texture information in accordance with the distance ratio:

$$U_{V0}'=DD_{V0} \cdot U_{V0}+DD_{V1} \cdot U_{V1}$$
$$V_{V0}'=DD_{V0} \cdot U_{V0}+DD_{V1} \cdot U_{V1} \quad \text{(Eq. 3)}$$

When the progression level is raised in the direction against the polygon reduction processing, i.e. towards a more detailed level, the reverse calculation as in Eq. 3 is performed. In other words, since the positions $V_2$–$V_7$ match $V_2'$–$V_7'$, the texture information ($U_{V2}'$, $V_{V2}'$)–($U_{V7}'$, $V_{V7}'$) can be applied unchanged, and a value proportional to the distance and calculated from $V_0'$, which is the closest to them, is applied to $V_0$ and $V_1$.

Thus, the amount of data processing with regard to texture information can be reduced when polygon vertices have been shifted by polygon reduction processing.

Eight Embodiment

The three-dimensional polygon display apparatus according to the eighth embodiment reduces the data amount that is necessary for texture-mapping. It reduces the amount of texture information itself, and improves the data structure of the texture information.

As has been explained for the prior art, if the number of polygon vertices inferring two-dimensional texture information for all vertices of each polygon surface is n, then 2n polygon surfaces are formed per average. If the polygon surfaces are triangles, there are three vertices per polygon surface, so that 3×2n sets of texture information, that is 6n sets of texture information are necessary.

The three-dimensional polygon display apparatus according to the present invention virtually develops a three-dimensional polygon model into a two-dimensional model at the time of model creation. The amount of texture information is reduced by assigning one set of texture information to each developed vertex. This makes use of the fact that texture information does not have to be assigned independently to each polygon surface, and that the texture information can also be developed and assigned to successive two-dimensional surfaces.

In other words, the data structure for the texture information in the three-dimensional polygon display apparatus of the eight embodiment is such that when the number of polygon vertices is n, and the number of polygon vertices on lines separated at the time of development is α, then there are (n+α) sets of texture information. When n is large, α becomes sufficiently small compared to n, and the number of texture information set can be taken to be n. Finally, the texture information that conventionally required 6n sets can be reduced to about n sets.

FIG. 16 illustrates this situation. FIG. 16b shows the two-dimensional development of the three-dimensional polygon shown in FIG. 16a The three-dimensional polygon in FIG. 16a has 22 vertices. When it is developed as shown in FIG. 16b, there are four polygon vertices on the line that is severed to separate the two edges, so that a total of 26 polygon vertices results. With the conventional data structure, 66 sets of texture information are necessary, but with the data structure of the apparatus according to the present invention, only 26 sets of texture information are necessary.

Ninth Embodiment

The three-dimensional polygon display apparatus according to the ninth embodiment improves the three-dimensional polygon display apparatus using improved texture information data structure of the eight embodiment even further.

Usually, to form a triangular polygon surface, a polygon vertex forms the triangular polygon surface together with two adjacent polygon vertices. However, since the polygon vertices on the developed cut-off line are divided onto the two edges, difficulties may arise when deciding how to combine the polygon vertices. The three-dimensional polygon display apparatus according to this ninth embodiment improves this point.

Figure 17:
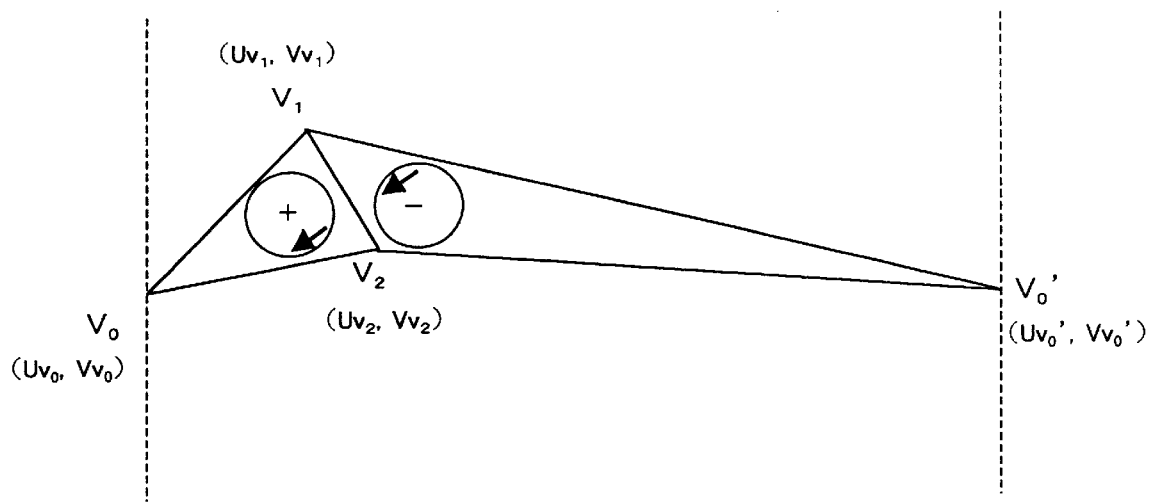
FIG. 17 emphasizes a portion of a three-dimensional polygon that is developed into two dimensions.

FIG. 17 shows the two-dimensional development of the three-dimensional polygon of FIG. 16b with emphasis on a certain portion. Note the polygon vertices $V_1$ and $V_2$. Correctly, the polygon surface $M_1$ should be formed by the polygon vertices $V_0$, $V_1$, and $V_2$. However, since the polygon vertex $V_0$ is divided into $V_0$ and $V_0'$, there is the possibility that the polygon surface $M_1'$ is selected.

To solve this problem, a three-dimensional polygon display apparatus of the present invention comprises the following characteristics.

The first characteristic is that the correct polygon surface $M_1$ can be determined by recognizing the front side and the reverse side of the polygon surfaces. The three-dimensional polygon display apparatus of this embodiment comprises a polygon front/reverse side recognition part using the vector product between the polygon vertices as a means for determining front and reverse side of the polygon surface.

For example, the face that is defined by following the polygon vertices counterclockwise is taken to be the polygon front face. When there are two candidates $M_1$ and $M_1'$ for texture mapping of the polygon front face, as shown in FIG. 17, the polygon front/reverse side recognition part calculates the vector product between the polygon vertices. If the vector product is positive, this means that the surface is defined by following the polygon vertices counterclockwise, and the surface is thus a front face.

In other words, the vector product $P_1$ for the polygon surface $M_1$ and the vector product $P_1'$ for the polygon surface $M_1'$ are $$P_1 = \overrightarrow{V_0V_1} \times \overrightarrow{V_0V_2}$$

$$P_1' = \overrightarrow{V_0'V_1} \times \overrightarrow{V_0'V_2} \qquad (Eq. 4)$$

Because $P_1 > 0$ and $P_1' < 0$, the polygon surface $M_1$ is determined to be a front face, and $M_1$ is subjected to texture mapping, while $M_1'$ is discarded.

The second characteristic is that the correct polygon surface $M_1$ can be determined from the height and the width of the polygon surfaces. This is particularly beneficial when the vector product corresponding to the above first characteristic cannot be used for the determination.

Figure 18A:
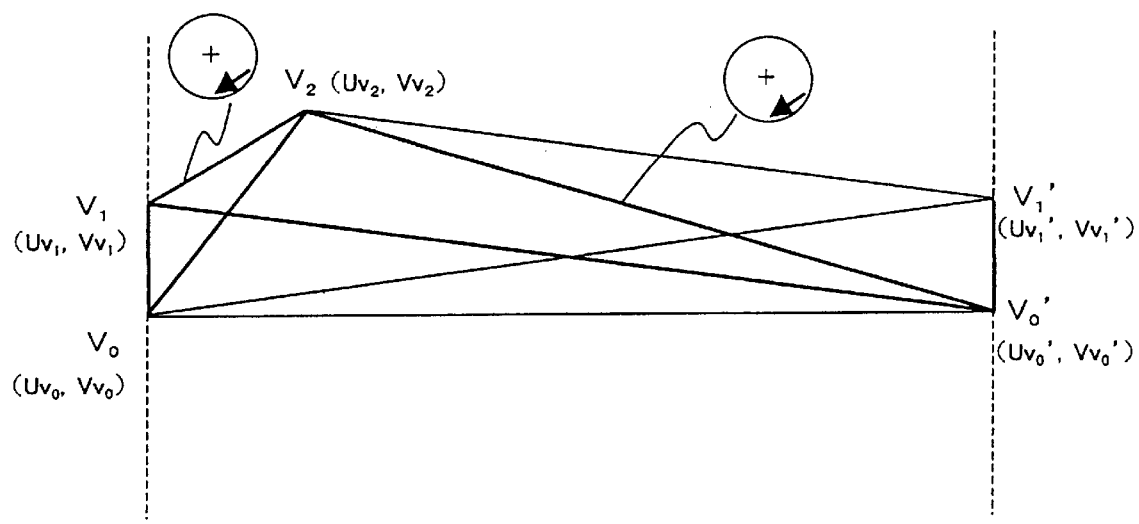
FIG. 18 illustrates a case where there is more than one vector product.

As FIG. 17, FIG. 18 shows the two-dimensional development of the three-dimensional polygon of FIG. 16b with emphasis on a certain portion. Note the polygon vertex $V_2$. Its neighboring vertices $V_0$ and $V_1$ are both located on the cut-off line and thus divided, so that there are also the vertices $V_0'$ and $V_1'$. Therefore, there are the four polygon surfaces $M_1$ ($V_0$, $V_1$, $V_2$), $M_2$ ($V_0'$, $V_1$, $V_2$), $M_3$ ($V_0'$, $V_1'$, $V_2$), and $M_4$ ($V_0$, $V_1'$, $V_2$), as candidates for the polygon surface that can be formed by $V_2$. When the polygon front/reverse side recognition part is applied to determine the front surface by calculating the vector product as explained for the first characteristic, the vector products $P_1$ to $P_4$ become $P_1 > 0$, $P_2 > 0$, $P_3 < 0$, and $P_4 < 0$. Thus, $M_3$ and $M_4$ can be discarded, but since the vector products for both $M_1$ and $M_2$ are positive, no final decision can be made.

Figure 18B:
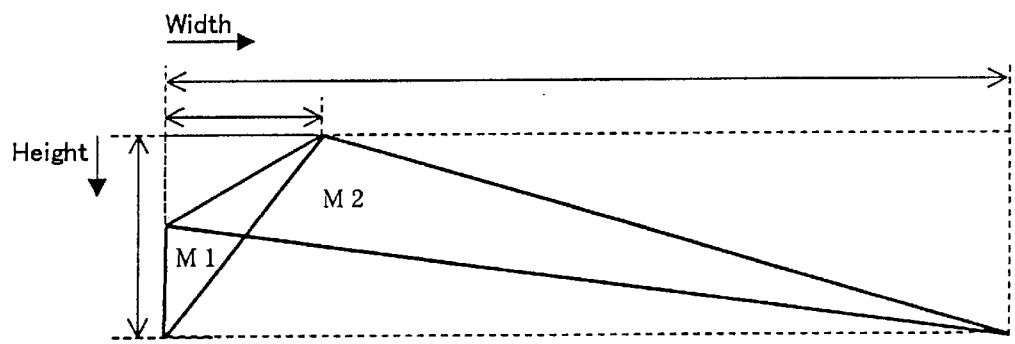

In this case, the height and the width of the polygon surfaces $M_1$ and $M_2$ are compared, as shown in FIG. 18b. For example, the sums of height and width of the polygon surfaces are calculated and compared. Since the polygon surface forms a fine outer surface, the polygon surface $M_1$, whose sum of height and width is smaller, can be taken to be the correct polygon surface.

Thus, it can be determined correctly and without difficulties how the polygon vertices have to be combined, even when a texture information data structure is used where the polygon vertices are cut off and divided onto two edges.

Tenth Embodiment

Figure 19:
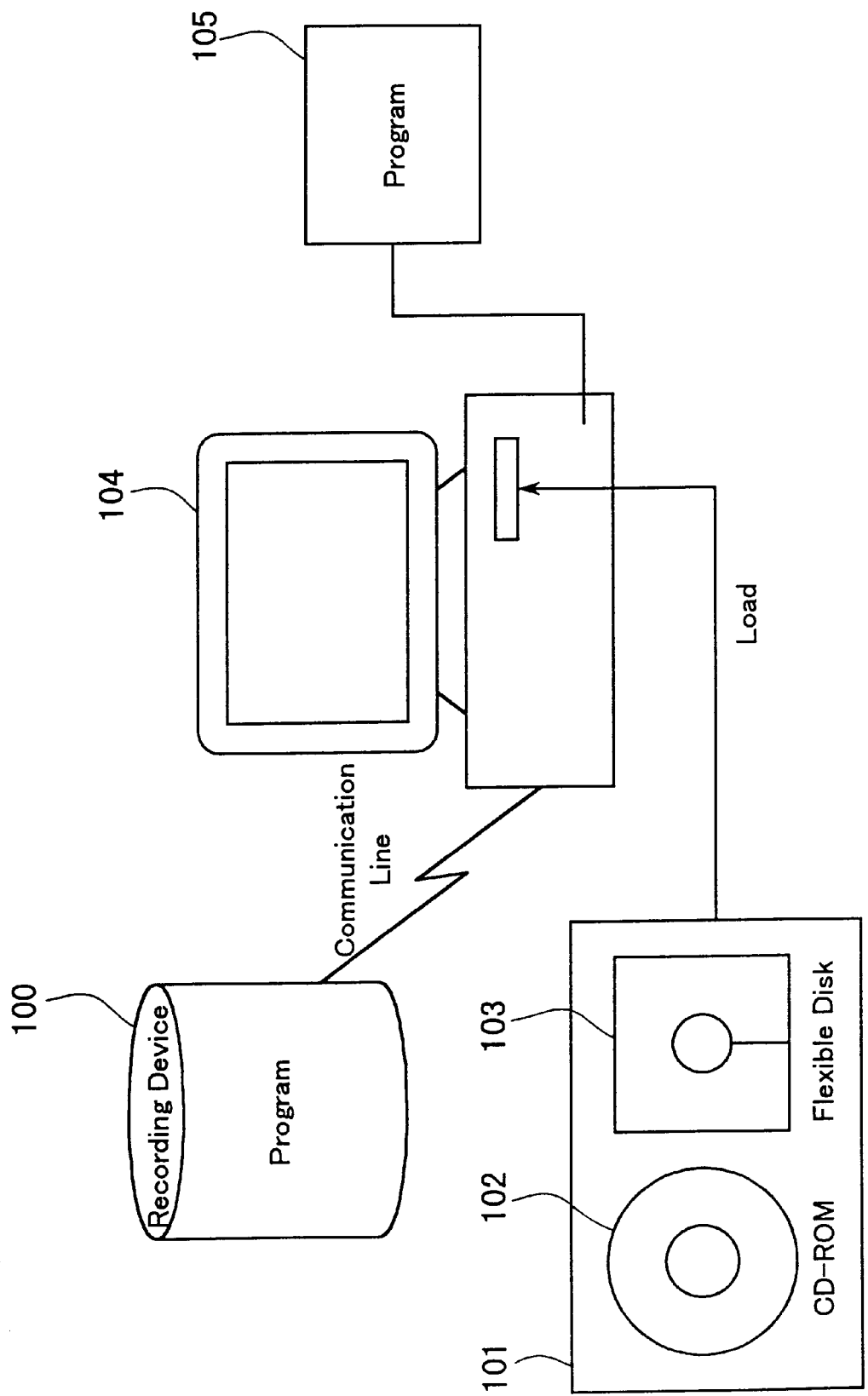
FIG. 19 is an example for a recording medium.
Figure 20:
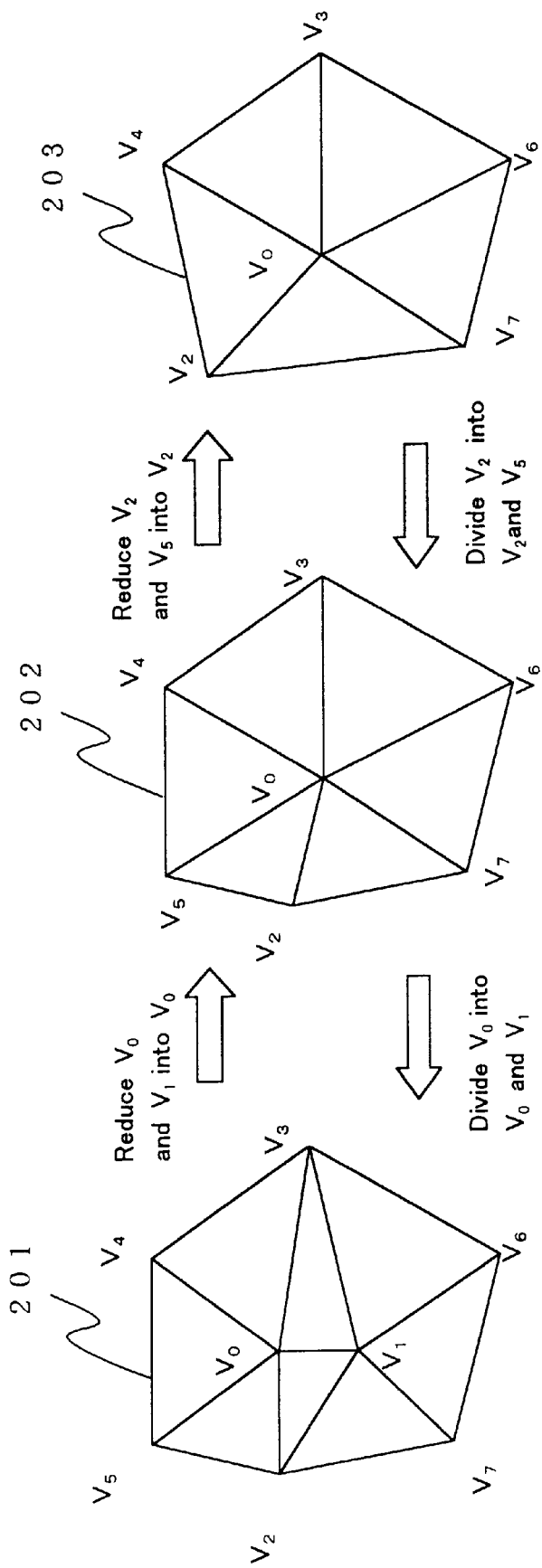
FIG. 20 illustrates the polygon reduction processing of a progressive polygon.

A three-dimensional polygon display apparatus according to the present invention can be built using a computer by providing a program executing the process steps for realizing the above-described configurations and storing it onto a computer-readable recording medium. As illustrated by the example shown in FIG. 19, a recording medium whereon a program comprising process steps for realizing a three-dimensional polygon display apparatus according to the present invention has been recorded can be a portable recording medium 101, such as a CD-ROM 102 or a flexible disk 103, a recording medium 100 inside a recording device on a network, or a recording medium 105 such as a computer hard disk or a RAM. When the program is executed, a computer 104 loads the program, and it is executed on its main memory.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A three-dimensional polygon display apparatus using progressive polygon data for forming a progressive polygon mesh of an object in accordance with a display resolution, comprising:

an object portion specifying part for specifying portions of the object to divide the object into object portions; and a polygon reduction adjusting/processing part for adjusting the extent to which the specified object portions are subjected to polygon reduction processing and for performing polygon reduction processing;

wherein the extent to which the amount of polygon data is reduced can be set for each object portion if polygon reduction processing is performed to reduce the amount of polygon data of the object.

2. The three-dimensional polygon display apparatus according to claim 1, wherein said polygon reduction adjusting/processing part comprises:

an object portion magnification part for magnifying a specified object portion;

a polygon reduction execution part for performing polygon reduction processing on the magnified object portion;

an object portion contraction part for contracting the object portion, which has been subjected to polygon reduction processing, to an original size that it had before the magnification; and an object composition part for storing the object portion, which has been contracted to its original size, in its original position of the object to compose the object;

wherein the extent to which polygon reduction processing is performed can be adjusted by magnifying the size of the object portion before polygon reduction processing.

3. The three-dimensional polygon display apparatus according to claim 1, wherein said polygon reduction adjusting/processing part comprises:

a polygon reduction execution part for performing polygon reduction processing;

a polygon reduction ratio specifying part for specifying a thinning-out ratio with which the amount of polygon data is reduced by said polygon reduction execution part;

wherein the extent to which polygon reduction processing is performed can be adjusted by individually setting with said polygon reduction ratio specifying part the thinning-out ratio for the object portions specified by said object portion specifying part.

4. The three-dimensional polygon display apparatus according to claim 1, wherein said polygon reduction adjusting/processing part comprises:

an object portion shifting/adjusting part for shifting and rearranging the specified object portions;

a polygon reduction execution part for performing polygon reduction processing; and an object composition part for storing the object portion in its original position of the object to compose the object;

wherein said object portion specifying part specifies an internal object portion that is enclosed by other object portions inside the object;

said object portion shifting/adjusting part shifts and rearranges the specified internal object portion outside the object;

said polygon reduction execution part performs polygon reduction processing on the rearranged object, so that polygon reduction processing is performed also on the object portion hidden inside the object.

5. The three-dimensional polygon display apparatus according to claim 1, wherein said polygon reduction adjusting/processing part comprises:

an object portion deforming/adjusting part for deforming the object;

a polygon reduction execution part for performing polygon reduction processing; and an object composition part for storing the object portion in its original position of the object to compose the object;

wherein said object portion specifying part specifies an enclosing object portion enclosing another object portions inside;

said object portion deforming/adjusting part deforms the enclosing object portion so as to expose the internal object portion that is enclosed inside;

said polygon reduction execution part performs polygon reduction processing on the deformed object, so that polygon reduction processing is performed also on the object portion hidden inside the object.

6. The three-dimensional polygon display apparatus according to claim 1, further comprising:

a texture information adjusting part for storing coordinates and texture information relating to polygon vertices before polygon reduction processing, and for creating texture information relating to polygon vertices after polygon reduction processing;

said texture information adjusting part comprising:

a polygon vertex comparing part for acquiring coordinates of polygon vertices after polygon reduction processing with said polygon reduction adjusting/processing part, and for comparing polygon vertex coordinates before and after polygon reduction processing; and a texture information allocating part for allocating stored texture information unchanged to matching polygon vertices as a result of a comparison of coordinates, and for appropriating and allocating texture information that corresponds to the polygon vertex with the coordinates that are the closest before reduction or shift, to a polygon vertex that does not match and has been subjected to reduction or shift.

7. The three-dimensional polygon display apparatus according to claim 1, further comprising:

a texture information adjusting part for storing coordinates and texture information relating to polygon vertices before polygon reduction processing, and for creating texture information relating to polygon vertices after polygon reduction processing;

said texture information adjusting part comprising:

a polygon vertex comparing part for acquiring coordinates of polygon vertices after polygon reduction processing with said polygon reduction adjusting/processing part, and for comparing polygon vertex coordinates before and after polygon reduction processing; and a texture information allocating part for allocating stored texture information unchanged to matching polygon vertices as a result of a comparison of coordinates, and for allocating, as texture information, a value in which the change corresponding to a reduction/shift distance has been corrected, assuming that the change of the texture information between surrounding polygon vertices is proportional to distance, to a polygon vertex that does not match and has been subjected to reduction or shift.

8. A computer-readable recording medium storing progressive polygon data used in a three-dimensional polygon display apparatus, wherein a data structure for texture information of the progressive polygon data comprises texture information for polygon vertices that are developed into two dimensions by virtually cutting a portion of a three-dimensional polygon.

9. A three-dimensional polygon display apparatus using progressive polygon data stored in the computer-readable recording medium of claim 8, comprising a polygon front/reverse side recognition part, which calculates the vector product between all polygon vertices in each polygon surface formed of the polygon vertices, which have been developed into two dimensions for texture mapping, and recognizes only the polygon surfaces that are formed of polygon vertices whose vector products are positive, wherein the polygon surfaces comprising polygon vertices that are divided into a plurality of polygon vertices when the three-dimensional polygon is virtually cut for the creation of an object from said progressive polygon data are formed correctly.

10. A three-dimensional polygon display apparatus using progressive polygon data stored in the computer-readable recording medium of claim 8, comprising a polygon surface recognition part, which calculates a sum of a height and a width of each polygon surface formed of the polygon vertices, which have been developed into two dimensions for texture mapping, and recognizes, of a plurality of polygon surfaces, those polygon surfaces with the smallest sum as the correct surfaces, wherein the polygon surfaces comprising polygon vertices that are divided into a plurality of polygon vertices when the three-dimensional polygon is virtually cut for the creation of an object from said progressive polygon data are formed correctly.

11. A computer-readable recording medium storing a program for realizing a three-dimensional polygon display apparatus using progressive polygon data forming a progressive polygon mesh of an object according to a display resolution, said program comprising:
   an object portion specifying step for specifying portions of the object to divide the object into object portions; and
   a polygon reduction adjusting/processing step for adjusting the extent to which polygon reduction processing is performed on the object portions that have been specified in said object portion specifying step and executing the polygon reduction processing;
   wherein if the amount of polygon data for the object is reduced by polygon reduction processing, the extent to which the amount of polygon data is reduced can be set for each portion of the object.

12. The recording medium according to claim 11, said program further comprising:
   a texture information adjusting/processing step for maintaining coordinates and texture information relating to polygon vertices before polygon reduction processing and for creating texture information relating to polygon vertices after polygon reduction processing;
   said texture information adjusting/processing step comprising
      a polygon vertex comparison processing step for acquiring coordinates of polygon vertices after polygon reduction processing with said polygon reduction adjusting/processing step, and for comparing polygon vertex coordinates before and after polygon reduction processing; and
      a texture information allocating/processing step for allocating stored texture information unchanged to matching polygon vertices as a result of a comparison of coordinates, and for appropriating and allocating texture information, that corresponds to the polygon vertex with the coordinates that are the closest before reduction or shift, to a polygon vertex that does not match and has been subjected to reduction or shift.

13. The recording medium according to claim 11, wherein said program further comprises:
   a texture information adjusting/processing step for maintaining coordinates and texture information relating to polygon vertices before polygon reduction processing and for creating texture information relating to polygon vertices after polygon reduction processing;
   said texture information adjusting/processing step comprising
      a polygon vertex comparison processing step for acquiring coordinates of polygon vertices after polygon reduction processing with said polygon reduction adjusting/processing step, and for comparing polygon vertex coordinates from before and after polygon reduction processing; and
      a texture information allocating/processing step for allocating stored texture information unchanged to matching polygon vertices as a result of a comparison of coordinates, and for assigning as texture information a value in which the change corresponding to a reduction/shift distance has been corrected, assuming that the change of the texture information between surrounding polygon vertices is proportional to their distance, to a polygon vertex that does not match and has been subjected to reduction or shift.

* * * * *